(12) United States Patent
Joseph

(10) Patent No.: US 7,349,663 B1
(45) Date of Patent: Mar. 25, 2008

(54) INTERNET RADIO STATION AND DISC JOCKEY SYSTEM

(75) Inventor: Robert L. Joseph, Atlanta, GA (US)

(73) Assignee: Leave a Little Room Foundation, Denver, CO (US)

( * ) Notice: Subject to any disclaimer, the term of this patent is extended or adjusted under 35 U.S.C. 154(b) by 526 days.

(21) Appl. No.: 10/422,691

(22) Filed: Apr. 24, 2003

(51) Int. Cl.
*H04H 1/00* (2006.01)

(52) U.S. Cl. ............... 455/3.02; 455/3.06; 455/414.1; 455/461; 709/231; 709/246; 709/224

(58) Field of Classification Search .............. 455/3.02, 455/3.06, 414.1, 461; 370/338, 401, 235, 370/395.5, 404, 265.09, 310; 379/218, 219; 705/35; 709/231, 246, 224; 713/163
See application file for complete search history.

(56) References Cited

U.S. PATENT DOCUMENTS

| | | | | |
|---|---|---|---|---|
| 5,210,820 | A * | 5/1993 | Kenyon | 704/200 |
| 6,223,210 | B1 * | 4/2001 | Hickey | 709/203 |
| 6,473,792 | B1 * | 10/2002 | Yavitz et al. | 709/217 |
| 6,581,103 | B1 * | 6/2003 | Dengler | 709/231 |
| 6,609,096 | B1 * | 8/2003 | De Bonet et al. | 704/500 |
| 6,895,084 | B1 * | 5/2005 | Saylor et al. | 379/88.22 |
| 6,914,897 | B1 * | 7/2005 | Schuster et al. | 370/352 |
| 2002/0156546 | A1 * | 10/2002 | Ramaswamy | 700/94 |
| 2003/0018551 | A1 * | 1/2003 | Hanson et al. | 705/35 |
| 2003/0037135 | A1 * | 2/2003 | Voleti et al. | 709/224 |
| 2003/0084283 | A1 * | 5/2003 | Pixton | 713/163 |
| 2004/0019497 | A1 * | 1/2004 | Volk et al. | 705/1 |
| 2004/0143349 | A1 * | 7/2004 | Roberts et al. | 700/94 |
| 2005/0120126 | A1 * | 6/2005 | Gupta et al. | 709/231 |
| 2005/0125302 | A1 * | 6/2005 | Brown et al. | 705/26 |
| 2005/0160270 | A1 * | 7/2005 | Goldberg et al. | 713/176 |
| 2005/0287972 | A1 * | 12/2005 | Christensen et al. | 455/186.1 |
| 2006/0004640 | A1 * | 1/2006 | Swierczek | 705/26 |
| 2006/0062094 | A1 * | 3/2006 | Nathan et al. | 369/30.06 |

* cited by examiner

*Primary Examiner*—Philip J. Sobutka
*Assistant Examiner*—Dominic Rego
(74) *Attorney, Agent, or Firm*—TIPS Group

(57) ABSTRACT

A method for producing a network-based radio show includes transmitting a plurality of segments over a network to a radio station server wherein the plurality of segments contain a plurality of voice tracks and an identification of song tracks located on the radio station server. The plurality of segments are verified and arranged into a play list on the radio station server. The play list is broadcast from the radio station server onto the network to create a network-based radio show, via the network.

14 Claims, 27 Drawing Sheets

FIGURE 1 "PRIOR ART"

```
#EXTM3U
#EXTINF:2,LLRD - Station ID
F:\Shoutcast\content\ LLR MP3\Additional\DJs\station\StationID.mp3
#EXTINF:273,Michael & Regina Winans - Track 04{15530}
F:\Shoutcast\content\ LLR MP3\Michael Regina Winans\Always Remember\Track_04.mp3
#EXTINF:25,Sounds Of Blackness - You've Taken My Blues & Gone{18162}
F:\Shoutcast\content\ LLR MP3\Sounds Of Blackness\Africa To America_The Journey\Youve_Taken_My_Blues__Gone.mp3
#EXTINF:232,Angie Winans - Roses again{12673}
F:\Shoutcast\content\ LLR MP3\Angie Winans\Melodies of My Heart\Roses_again.mp3
#EXTINF:369,GMWA Men's Chorus - It's Been Joy{14405}
F:\Shoutcast\content\ LLR MP3\GMWA Mens Chorus\Live In Los Angeles\Its_Been_Joy.mp3
#EXTINF:5,Paul - Station ID 4{17783}
F:\Shoutcast\content\ LLR MP3\Additional\DJs\station\Station ID 4.mp3
#EXTINF:345,Juanita Bynum - Peace Instrumental{14929}
F:\Shoutcast\content\ LLR MP3\Juanita Bynum\Morning Glory\Peace_Instrumental.mp3
#EXTINF:494,The GMWA Gospel Announcers Guild - In The Presence Of The Lord{14354}
F:\Shoutcast\content\ LLR MP3\GMWA Gospel Announcers Guild\RADIO ANGELS\In_The_Presence_Of_The_Lord.mp3
#EXTINF:7,Paul - Station ID 3{17782}
F:\Shoutcast\content\ LLR MP3\Additional\DJs\station\Station ID 3.mp3
#EXTINF:230,Walter Hawkins - Come By Here, Good Lord{18583}
F:\Shoutcast\content\ LLR MP3\Walter Hawkins\Love Alive II\Come_By_Here_Good_Lord.mp3
#EXTINF:255,New York Restoration Choir - Lamb of God, Part 1{17897}
F:\Shoutcast\content\ LLR MP3\New York Restoration Choir\Thank You Jesus\Lamb_of_God_Part_1.mp3
#EXTINF:5,Paul - Station ID 2{17781}
F:\Shoutcast\content\ LLR MP3\Additional\DJs\station\Station ID 2.mp3
#EXTINF:293,BeBe & CeCe Winans - These What Abouts{12850}
F:\Shoutcast\content\ LLR MP3\BeBe and CeCe Winans\Relationships\These_What_Abouts.mp3
#EXTINF:200,Yolanda Adams - Never Alone{18683}
F:\Shoutcast\content\ LLR MP3\Yolanda adams\Songs From The Heart\Never_Alone.mp3
#EXTINF:239,Kirk Franklin - He's Able{15070}
F:\Shoutcast\content\ LLR MP3\Kirk Franklin\Kirk Franklin The Family\Hes_Able.mp3
#EXTINF:335,James Hall - take Him at His Word{14888}
F:\Shoutcast\content\ LLR MP3\James Hall\We Are At Wantake_Him_at_His_Word.mp3
#EXTINF:16,Paul - Station ID 5{17784}
F:\Shoutcast\content\ LLR MP3\Additional\DJs\station\Station ID 5.mp3
```

Fig 3: Playlist File for WinAmp

```
#Software: SHOUTcast
#Version: 1.9.2
#Fields: c-ip c-dns date time cs-uri-stem c-status cs(User-Agent) sc-bytes x-duration avgbandwidth
158.106.50.3 158.106.50.3 2002-11-26 11:47:33 /stream?title=Hillsongs%20Nusic%20%2D%20River 200 RMA%2F1%2E0%20%28compatible%3B%20RealMedia%29 502754 82 49048
12.119.64.62 12.119.64.62 2002-11-26 11:47:33 /stream?title=Hillsongs%20Nusic%20%2D%20River 200 WinampMPEG%2F2%2E8 180224 27 53392
158.106.50.3 158.106.50.3 2002-11-26 11:51:46 /stream?title=Avalon%20%2D%20Give%20It%20Up 200 RMA%2F1%2E0%20%28compatible%3B%20RealMedia%29 759636 253 24016
12.119.64.62 12.119.64.62 2002-11-26 11:51:46 /stream?title=Avalon%20%2D%20Give%20It%20Up 200 WinampMPEG%2F2%2E8 770048 253 24344
158.106.50.3 158.106.50.3 2002-11-26 11:56:43 /stream?title=Petra%20%2D%20Breathe%20In 200 RMA%2F1%2E0%20%28compatible%3B%20RealMedia%29 891589 298 23928
12.119.64.62 12.119.64.62 2002-11-26 11:56:43 /stream?title=Petra%20%2D%20Breathe%20In 200 WinampMPEG%2F2%2E8 892928 298 23968
158.106.50.3 158.106.50.3 2002-11-26 11:56:48 /stream?title=Unknown%20Artist%20%2D%20Station%20ID%204 200
RMA%2F1%2E0%20%28compatible%3B%20RealMedia%29 16024 4 32048
12.119.64.62 12.119.64.62 2002-11-26 11:56:48 /stream?title=Unknown%20Artist%20%2D%20Station%20ID%204 200 WinampMPEG%2F2%2E8 8192 4 16384
158.106.50.3 158.106.50.3 2002-11-26 12:01:06 /stream?title=Steven%20Curtis%20Chapman%20%2D%20All%20Ye%20Faithful 200 RMA%2F1%2E0%20%28compatible%3B%20RealMedia%29 775013 258 24024
12.119.64.62 12.119.64.62 2002-11-26 12:01:06 /stream?title=Steven%20Curtis%20Chapman%20%2D%20All%20Ye%20Faithful 200 WinampMPEG%2F2%2E8 786432 258 24384
158.106.50.3 158.106.50.3 2002-11-26 12:04:41 /stream?title=Jars%20Of%20Clay%20%2D%20Can%60t%20Erase%20it 200 RMA%2F1%2E0%20%28compatible%3B%20RealMedia%29 646982 215 24072
12.119.64.62 12.119.64.62 2002-11-26 12:04:41 /stream?title=Jars%20Of%20Clay%20%2D%20Can%60t%20Erase%20it 200 WinampMPEG%2F2%2E8 655360 215 24384
12.119.64.62 12.119.64.62 2002-11-26 12:06:03 /stream?title=The%20Williams%20Brothers%20%2D%20Never%20Let%20Go%20Of%20Your%20Hand 200 WinampMPEG%2F2%2E8 65536 83 6312
158.106.50.3 158.106.50.3 2002-11-26 12:08:29 /stream?title=The%20Williams%20Brothers%20%2D%20Never%20Let%20Go%20Of%20Your%20Hand 200 RMA%2F1%2E0%20%28compatible%3B%20RealMedia%29 684226 228 24000
158.106.50.3 158.106.50.3 2002-11-26 12:13:35 /stream?title=Point%20of%20Grace%20%2D%20Better%20Days 200 RMA%2F1%2E0%20%28compatible%3B%20RealMedia%29 919113 307 23944
12.119.64.62 12.119.64.62 2002-11-26 12:13:35
```

Fig 4: Log File

Fig 6: Sign on screen

Fig 7: Main Screen

Fig 8: Voice Track Screen

Fig 9: Dynamic Show Song Selection

Fig 10: Edit Dynamic Show Song Selection

Fig 11: Dynamic Show Voice Selection

Fig 12: Edit Dynamic Show Voice Selection

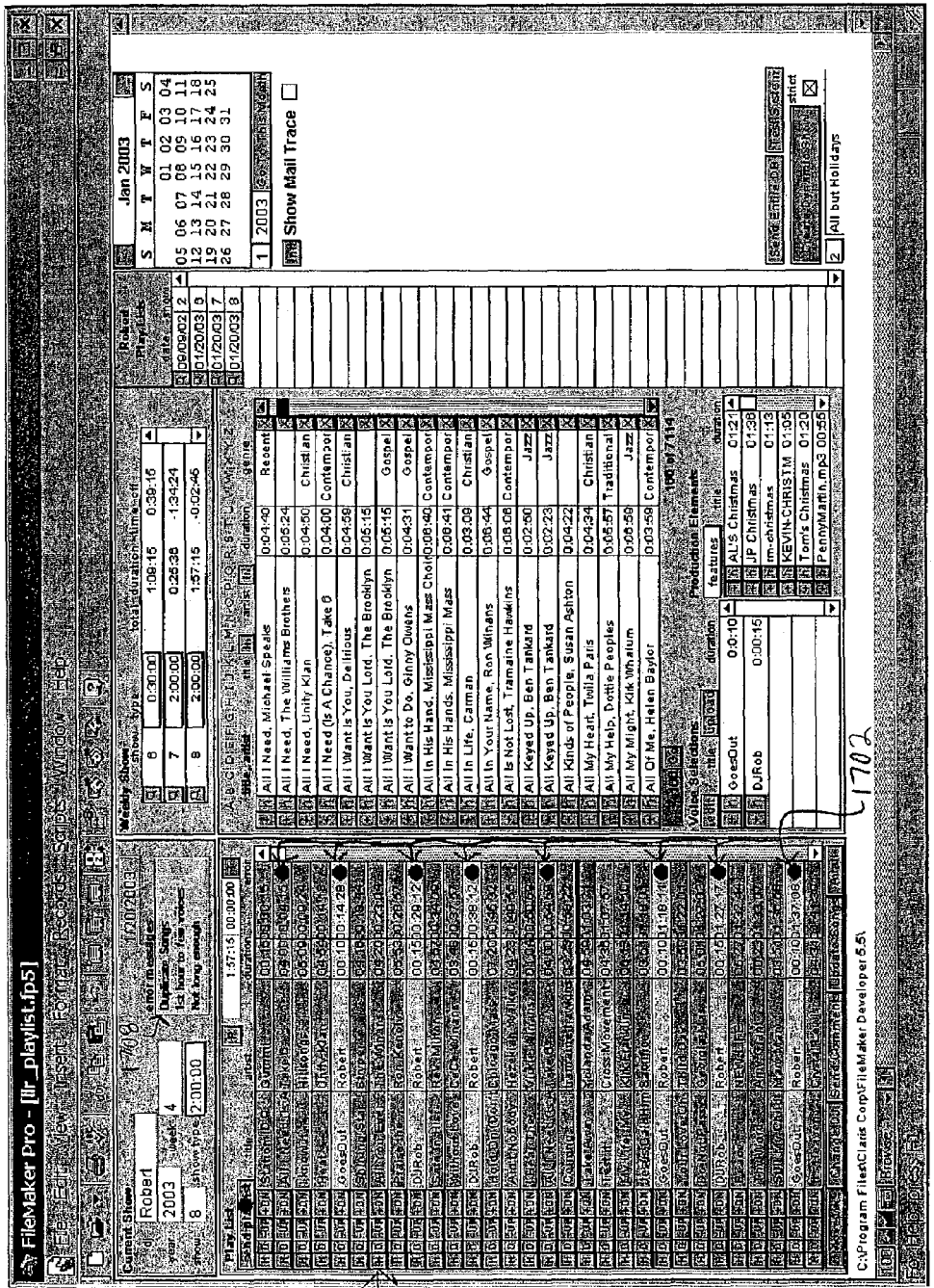
Fig 17: Errors Analysis

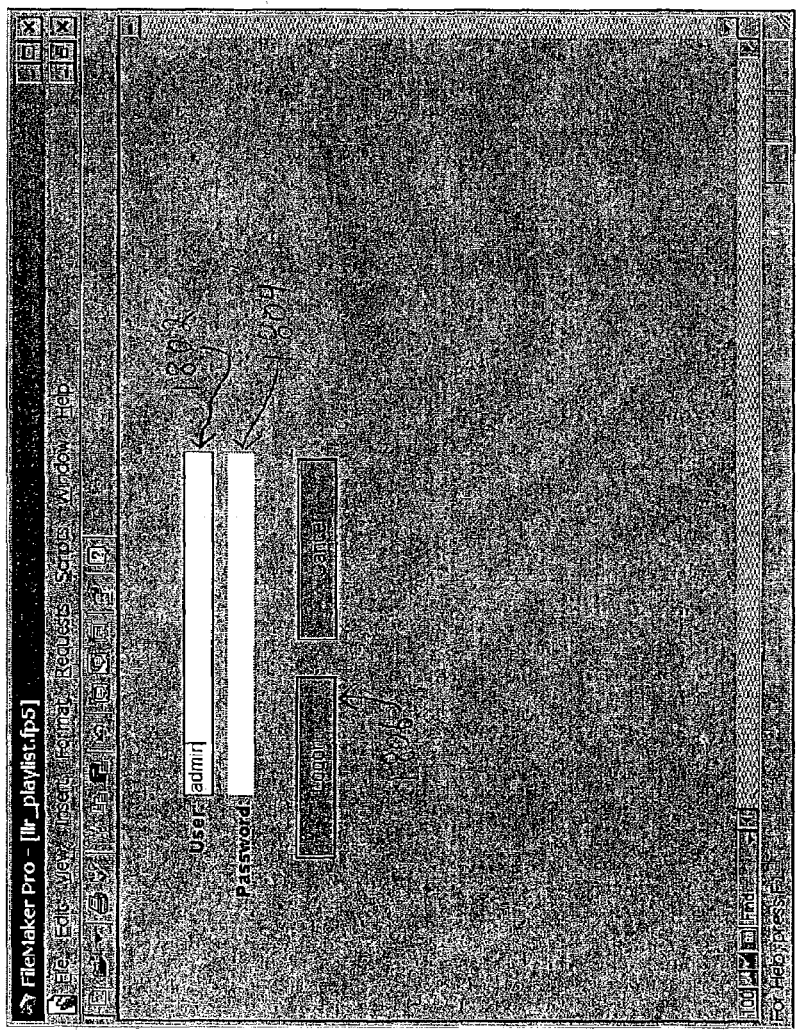
Fig 18: PR Login

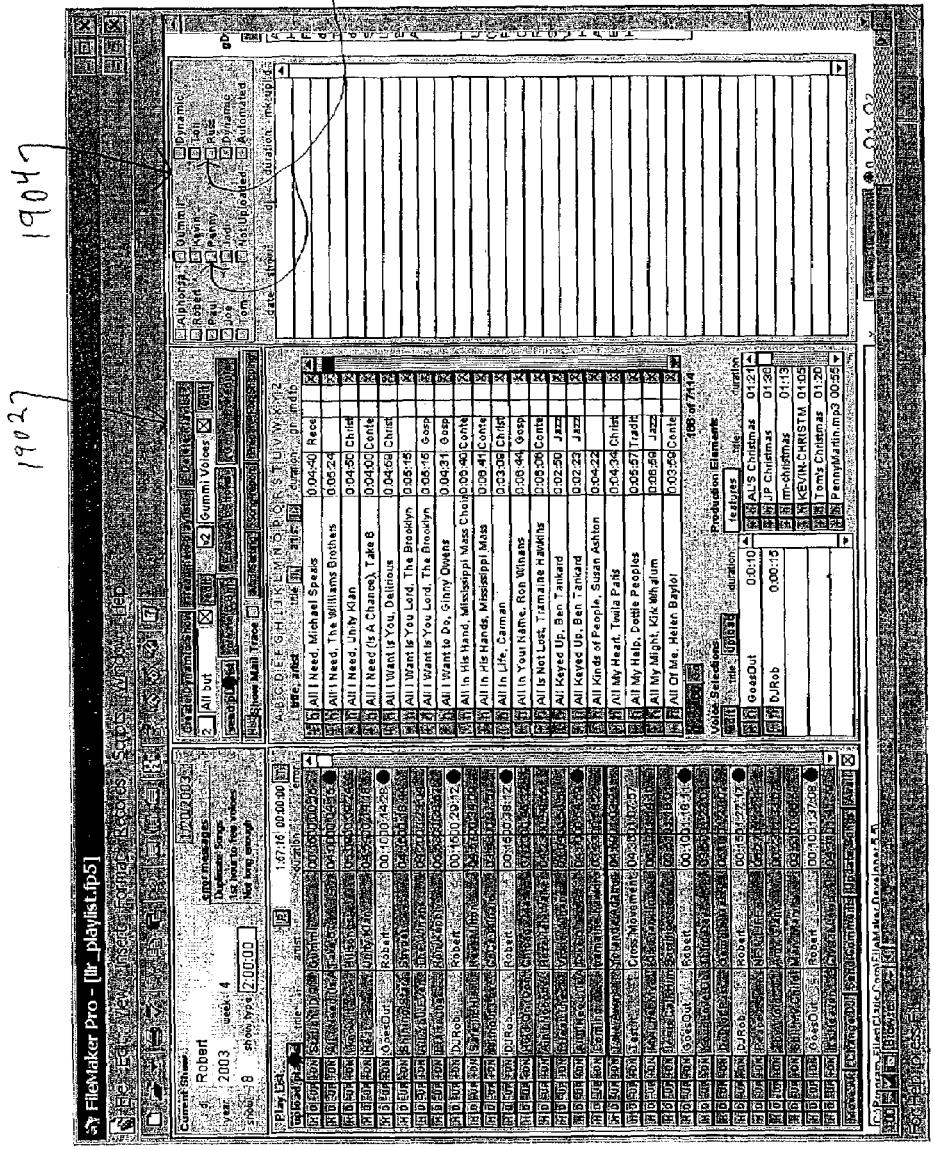
Fig 19: PR System

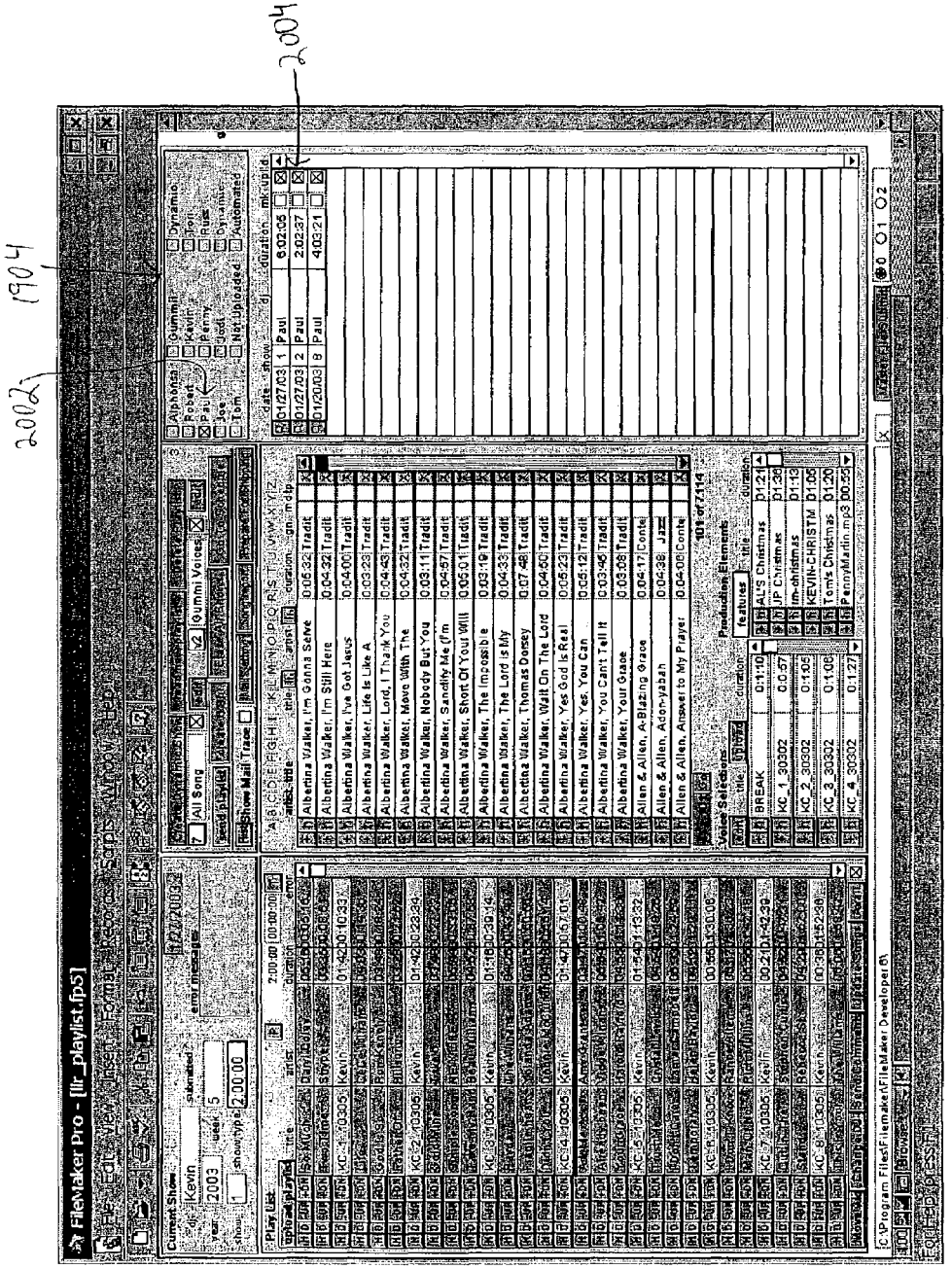
Fig 20a: 1 Selection

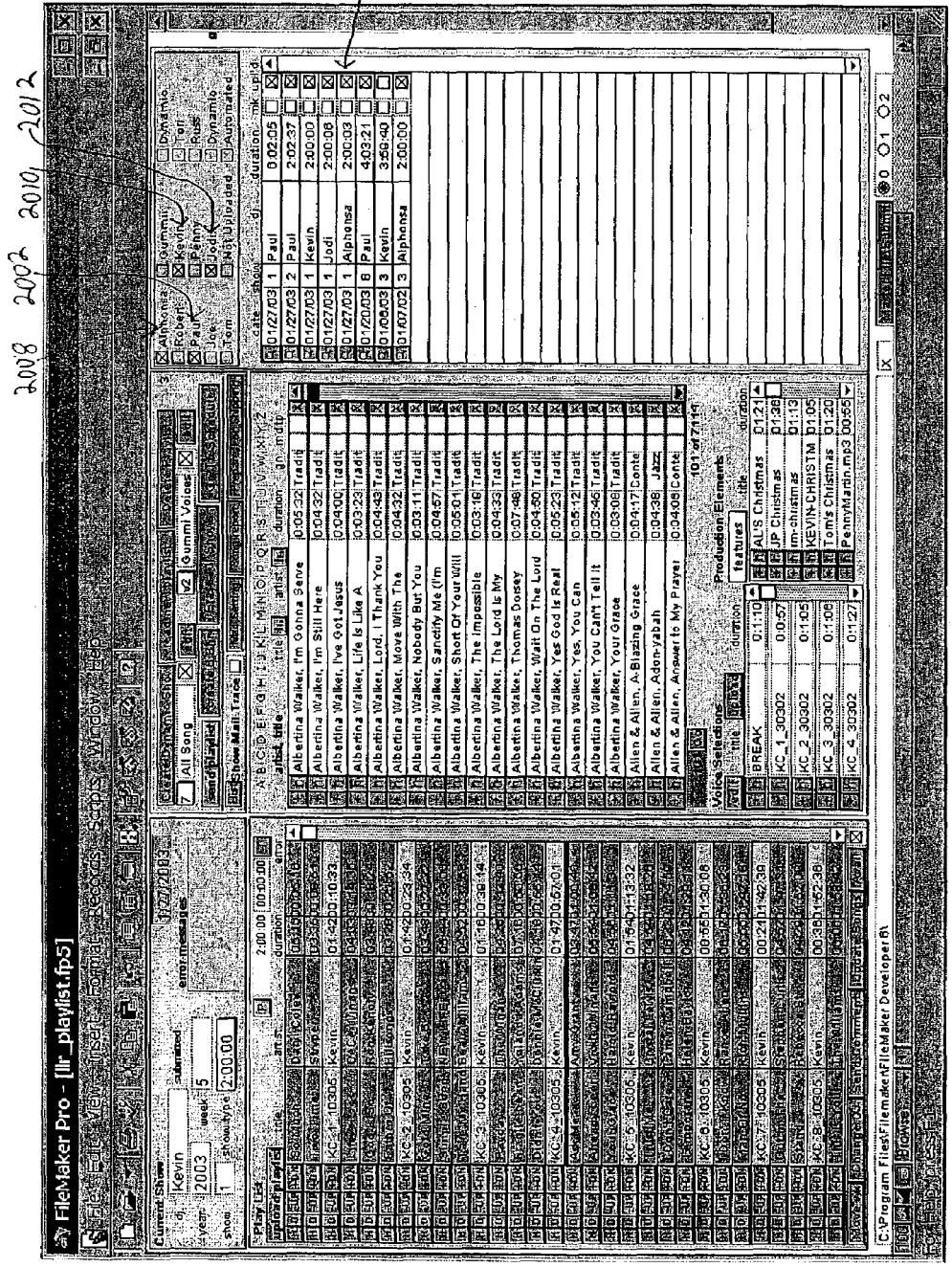
Fig 20b: 4 Selections

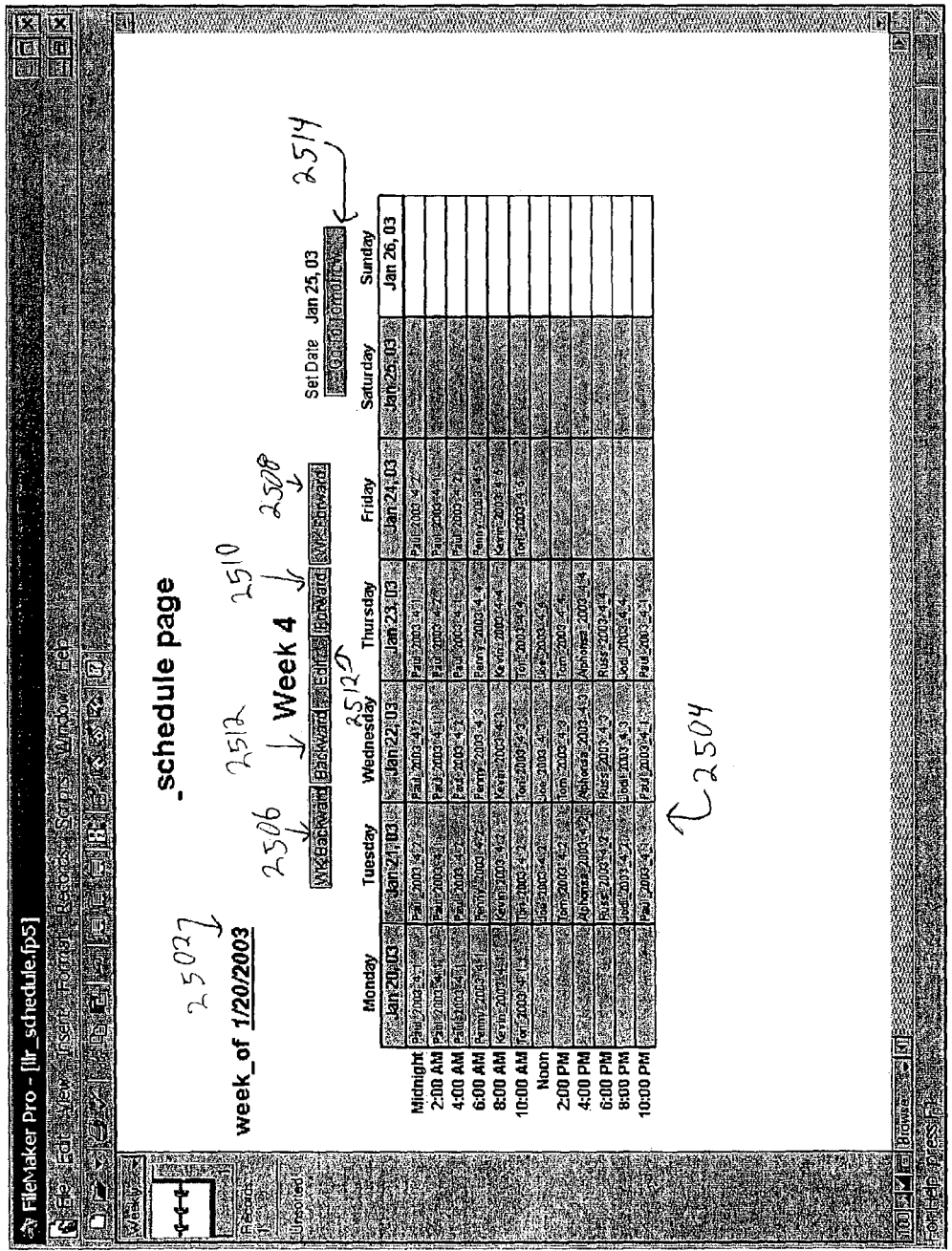
Fig 25: Scheduler system for viewing week

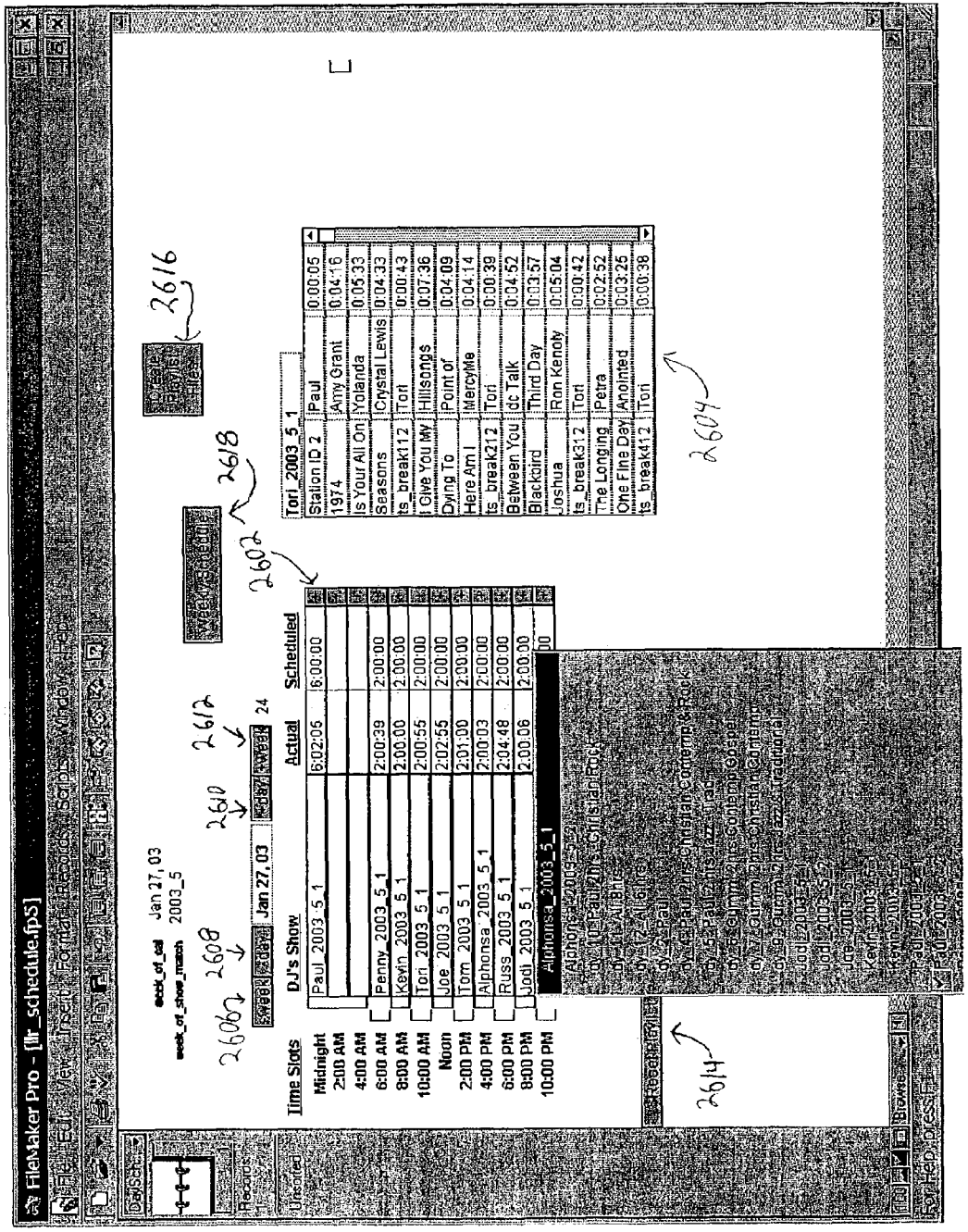
Fig 26: Single day scheduling system – illustrates Tori was clicked

INTERNET RADIO STATION AND DISC JOCKEY SYSTEM

FIELD OF THE INVENTION

The present invention relates generally to Internet radio broadcasting, and more particularly to systems for facilitating Internet web-casting.

BACKGROUND OF THE INVENTION

FIG. 1 is a prior art system 100 for supporting an Internet web-cast. Included is an Internet radio station server 102 for transmitting the Internet web-cast, an Internet or equivalent network 104, and a plurality of users 106 that connect through the Internet 104 to the Internet radio station server 102. Included in the server 102 is play list 108, a WINAMP® player 110, a storage device 112 coupled to the WINAMP® player 110, a SHOUTCAST® streaming broadcaster module 114 and a log file 116.

The play list 108 can contain a list of song tracks to play, interweaved with voice tracks and possibly commercials. The WINAMP® player accesses the information contained on the play list 108 and plays the required file, for example an ".mp3" song track, located on storage device 112. SHOUTCAST® module 114 then transmits the web-cast to users 106 via the Internet 104. In addition to the WINAMP® player 118, a different type or other feed 118, for example from a live broadcast, can be coupled to the SHOUTCAST® module 114.

The WINAMP® player 110 and SHOUTCAST® streaming broadcaster 114 are available from the Nullsoft Corporation of Sedona, Ariz. Additionally, Media Player from the Microsoft Corporation of Redmond, Wash. can take the place of the WINAMP® player 110. Similarly, RealAudio offered by the Real Networks Corporation of Seattle, Wash. can also take the place of the WINAMP® player 110. Additionally, Icecast, offered by the Icecast organization, can take the place of the SHOUTCAST module 114.

While system 100 provides a mechanism for broadcasting or webcasting over the Internet, it suffers from several drawbacks. One of these drawbacks is that it does not provide an integrated interface to manage programs created by multiple disc-jockeys. To achieve this end, a producer would need to obtain play lists and then make sure all the necessary voice and song files are available on storage device 112 and in the correct place on storage device 112.

Another drawback is that no mechanism is provided to pay disc jockeys for creating a play-list/program. Additionally, disc jockeys and producers typically need local access to server 102 to compile a play-list in an easy fashion due to bandwidth limitations over a remote connection. As a result, neither a disc jockey or a producer can easily work remotely.

One way to solve the bandwidth limitation is to have a complete library of song tracks and related items available on each user's local computer. However, if an update to an individual file is required, propagating that update is not a trivial matter if multiple copies exist on a plurality of computers.

Yet another issue not addressed by system 100 is that it does not easily allow for the insertion of production elements such as station ID's and the like.

Accordingly, what is needed is a method and apparatus for an integrated web-cast system that allows for easy organization of multiple disc-jockey programs that gives flexibility to where a producer or disc jockey can work and allow for easy insertion of production elements.

SUMMARY OF THE INVENTION

The present invention fills these needs by providing an efficient and economical method and system for an Internet-based radio station and disc jockey system. It should be appreciated that the present invention can be implemented in numerous ways, including a method and system. Several inventive embodiments of the present invention are described below A method for producing a network-based radio show, in accordance with an embodiment of the present invention, includes transmitting a plurality of segments over a network to a radio station server wherein the plurality of segments contain a plurality of voice tracks and an identification of song tracks located on the radio station server. The plurality of segments are verified and arranged into a play list on the radio station server. The play list is broadcast from the radio station, server onto the network to create a network-based radio show, via the network.

A method for producing a network-based radio show, in accordance with an embodiment of the present invention, includes a plurality of "disc jockeys" sending a plurality of segments over a network to a radio station server wherein the plurality of segments contain a plurality of voice tracks and an identification of song tracks located on the radio station server. By "disc jockey" or "D.J.", it is meant the person who puts together a program/segment including selecting song titles, commentary, etc. Also included is a producer verifying and arranging the plurality of segments into a play list on the radio station server, via the network, into the network-based radio show. A plurality of listeners can then access the network-based radio show, via the network.

A system for a network-based radio show, in accordance with another embodiment of the present invention, includes a radio station server, coupled to a network, for hosting a plurality of segments arranged by a producer into a play list wherein the play list is available to a plurality of users via the network. Also included is a plurality of disc jockeys that create and upload the plurality of segments over the network to the radio station server.

A method for creating a packet-based network program, in accordance with a final embodiment of the present invention, includes providing a network radio server having a music library and a list of songs in the music library, the network radio server being coupled to a packet-based network. Also, included in the method is communicating with a remote server connected to the packet-based network such that the remote server can download a list of songs and such that the remote server can upload a program segment to the network radio server, including at least one song title from the song list.

An advantage of the present invention is that disc jockeys and producers can work remotely since song tracks are located on a central server. As a result, only information relating to an identification of songs and the order needs to be propagated, in addition to any custom voice tracks made for a particular show. Since the song tracks are located centrally, updates do not need to be propagated. Another advantage is that producers have an easy to use interface for checking segments and arranging them into play lists before they are broadcast.

These and other advantages of the present invention will become apparent to those skilled in the art after reading the following descriptions and studying the various figures of the drawings.

BRIEF DESCRIPTION OF THE DRAWINGS

FIG. 3 illustrates an example play list file for use with a WINAMP® player in accordance with the presence invention.

FIG. 4 illustrates an example log file for use with a SHOUTCAST® module in accordance with the present invention.

FIG. 17 illustrates the errors analysis screen in accordance with the present invention.

FIG. 18 illustrates the producer sign on screen in accordance with the present invention.

FIG. 19 illustrates the main screen of the producer section of the present invention.

FIG. 20A illustrates the selection of one disc jockey in accordance with the present invention.

FIG. 20B illustrates the selection of four disc jockeys in accordance with the present invention.

FIG. 25 illustrates the scheduler system for a week view in accordance with the present invention.

FIG. 26 illustrates the scheduler system for a single day view in accordance with the present invention.

DETAILED DESCRIPTION OF THE INVENTION

Figure 1:
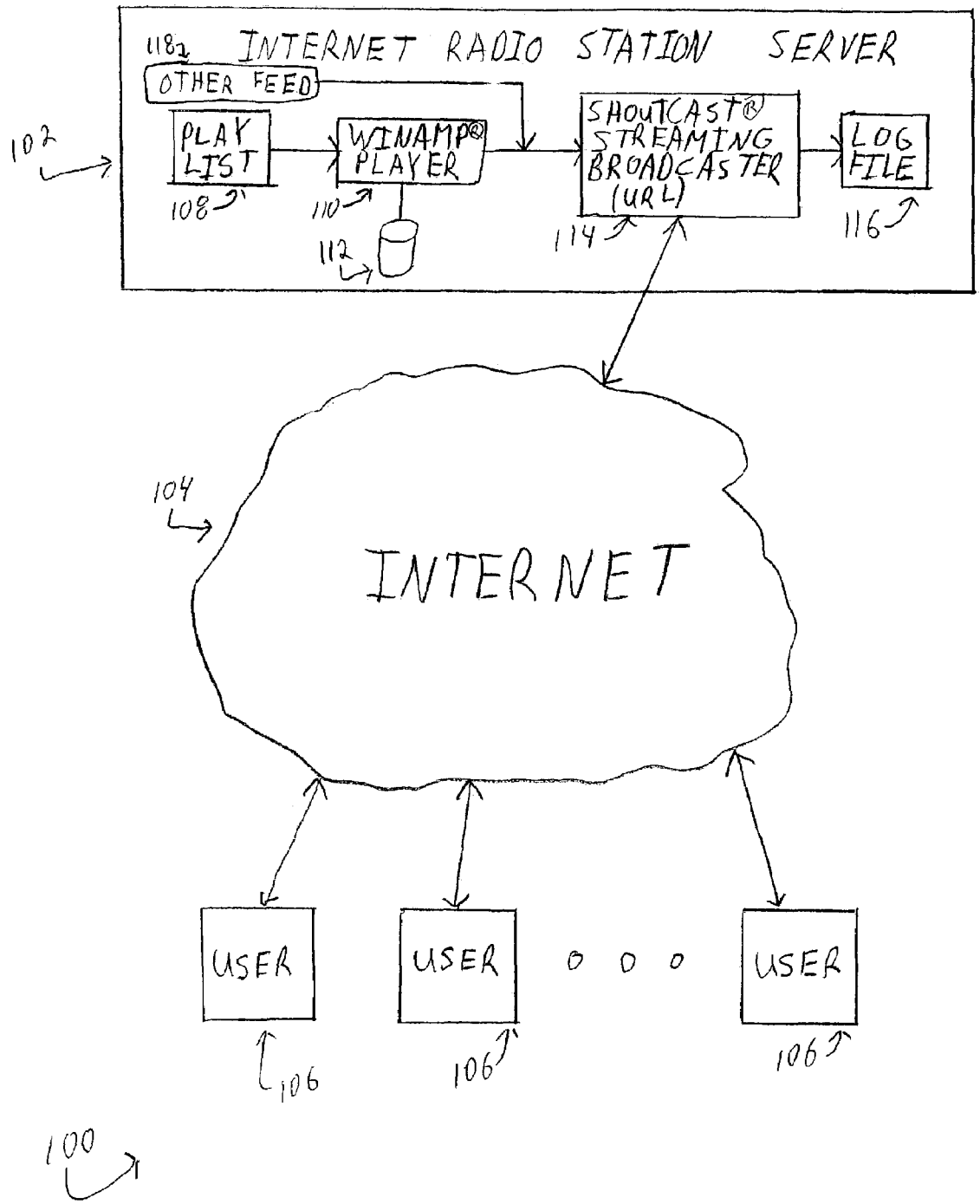
FIG. 1 is a block diagram of a prior art system for supporting an Internet web-cast.

FIG. 1 was described with reference to the prior art. The present invention provides a method and system for implementing an Internet radio station and disc jockey system.

With the system of the present invention, a disc jockey is able to create a show segment that includes songs, voice tracks and production elements. A play list is then generated, based on the segment, and is sent, along with the voice tracks, to a central server that has the songs and production elements. A producer can then review the play list to make sure it meets any requirements. Once the play list is verified, the producer schedules it, along with play lists generated by other disc jockeys, for play over the Internet. Parts of present invention are implemented in FILEMAKER PRO® which is publicly available from the FileMaker Corporation of Santa Clara, Calif. FILEMAKER PRO® is well known to those skilled in the art and as such will not be described in detail, as to not unnecessarily obscure the scope of the present invention.

In the context of the present invention, it should be understood that the term "play list" refers to two or more shows, programs or segments that disc jockeys created. Additionally, the term "segment" refers to a single show/program created by a disc jockey. By "disc jockey" or "D.J.", it is meant the person who puts together a program/segment including selecting song titles, commentary, etc.

Figure 2:
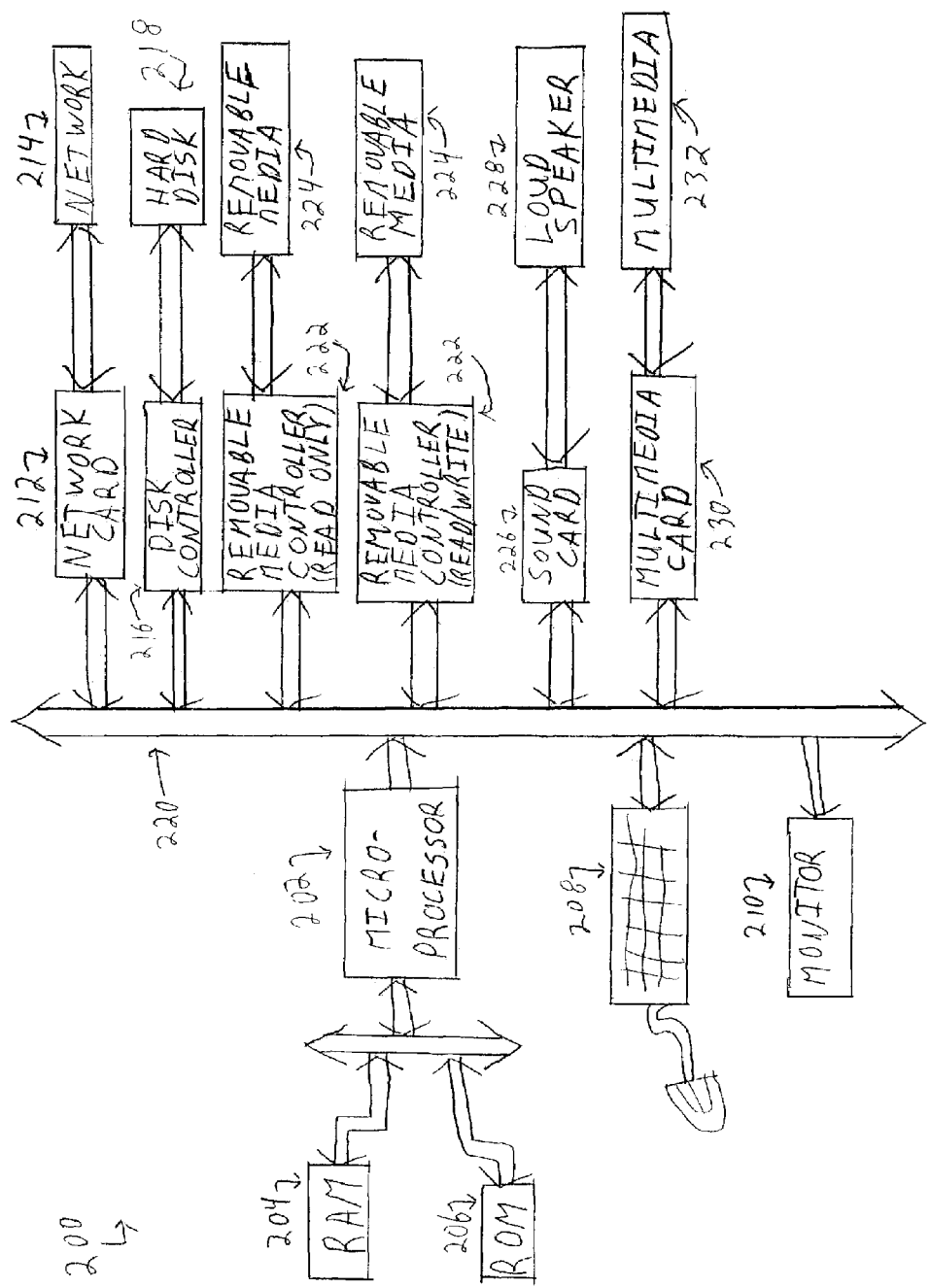
FIG. 2 is a block diagram of a suitable hardware architecture used for supporting an Internet radio station and disc jockey system, in accordance with the present, invention.

FIG. 2 is a block diagram of a suitable hardware architecture 200 used for supporting an Internet radio station and disc jockey system, in accordance with the present invention. The hardware architecture 70 includes a microprocessor 202 coupled to a random access memory (RAM) 204 and a read only memory (ROM) 206, a keyboard 208, a monitor 210, a network card 212 coupled to a network 214, a disk controller 216 coupled to a hard disk 218, all bi-directionally coupled to a databus 220. Additionally, a removable media controller 222 coupled to a removable media 224, a sound card 226 coupled to a loud speaker 228 and a multimedia card 230 coupled to a multimedia device 232, all bi-directionally coupled to the databus 220, can all optionally be included.

FIG. 3 illustrates an example play list file 108 for use with a WINAMP® player in accordance with the presence invention. Included is a file header "#EXTM3U" 302 that identifies the file as a play list type file, a station ID 304 along with the file location of the station ID 306, and a plurality of artist identifications 308 and associated file locations 310. Each track/file is played in the order specified in the play list. In a typical embodiment, the various are stored in an ".mp3" type format.

FIG. 4 illustrates an example log file 116 for use with a SHOUTCAST® module in accordance with the present invention. Included are various field such as IP address 402, a domain name server (DNS) 404, a date 406, a time 408, a uniform resource identifier (URI) stem 410, a status 412, a user-agent field 414, a number of transferred bytes 416, a duration field 418 and finally, an average bandwidth 420. Using the various entries contained in the log file 400, a producer (not shown) can gain determine where a person is connecting from, connection duration, songs that were streamed and other useful statistics. The use of log files is well known to those skilled in the art and as such will not be fully described in order to not unnecessarily obscure the present invention. Similarly, SHOUTCAST® and WINAMP® are also well known to those in the art, and publicly available, and will also not be described in detail.

Figure 5:
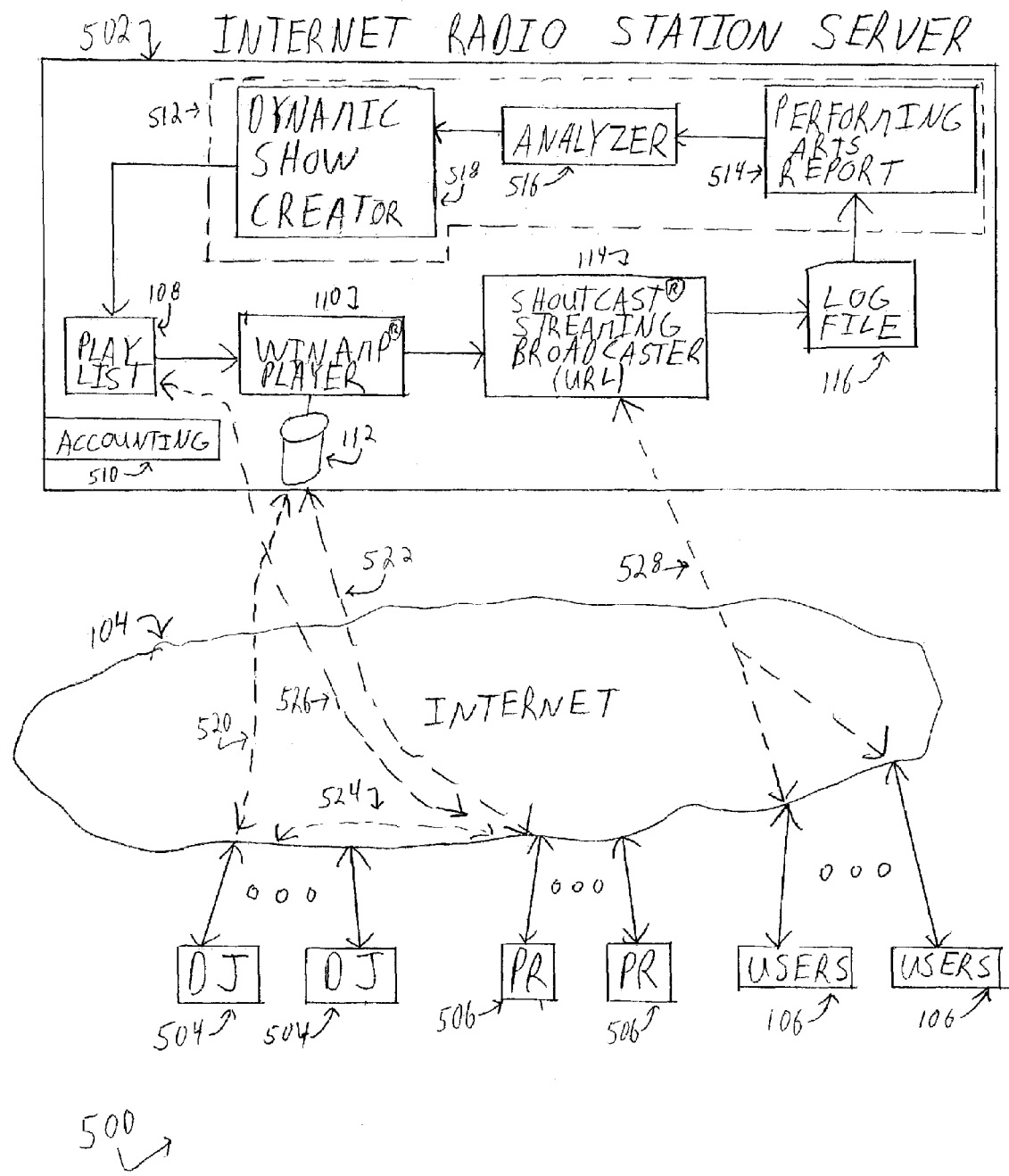
FIG. 5 illustrates an Internet radio station/disc jockey system in accordance with the present invention.

FIG. 5 illustrates an Internet radio station/disc jockey system 500 in accordance with the present invention. Included is an Internet radio station server 502, an Internet or equivalent network 104, a plurality of disc jockeys 504, a plurality of producers 506 and a plurality of users 106. The disc jockeys 504, producers 506 and users 508 connect to the Internet radio station server 502 via the Internet 104. Similar to server 102 of the prior art, the Internet radio station server 502 includes a play list 108, a WINAMP® player 110, a SHOUTCAST® streaming broadcaster 114, a log file 116 and a storage device 112 coupled to the WINAMP® player 110. Additionally, server 502 has an accounting module 510 and a dynamic show creation module 512 coupled to the play list 108 and the log file 116. Included, in module 512, is a performing arts report 514, an analyzer 516 and a dynamic show creator 518. Accounting module 510 and dynamic show creation module 512 will be explained in more detail subsequently. It will be appreciated by one skilled in the art that D.J. 504 can also be referred to as a "disc jockey station" and can take the form of a desktop or portable computer system with a network interface.

In practice, disc jockey's 504 create a show segment (not shown) locally that includes voice tracks, information regarding song tracks and information regarding production elements. The show segment is then sent to storage device 112 as indicated by path 520, via Internet 104. It should be noted that the show segment propagated to storage device 112 does not contain the actual song tracks and production elements used when the show segment is broadcast. Instead, information identifying the song tracks and production elements are merely included. Advantageously, this does not require that a full library of music and production elements be available to a disc jockey 504, locally, in order to produce a show segment. Additionally, since much less information needs to be uploaded to server 502, transmittal of the show segment is easily accomplished. In the event that a disc jockey would like to hear a particular song or other show component, it can always be downloaded from server 502. An additional advantage to this method is that if a particular song or production element needs to be updated, it only needs to be done so once instead of having to propagate the change to multiple locations, for example on each of the disc jockeys' 504 computers.

With further reference to FIG. 5, once a segment has been uploaded to server 502, a producer 506 can check the segment via link 522. The producer 506 can check a segment for a variety of parameters such as a minimum number of songs per hour, production elements and the presence of voice tracks. If the segment does not meet any of the parameters/criteria, the producer 506 can send a message to disc jockey 506 via a link 524. Once the producer 506 has one or more segments that meet the proper criteria, they can be assembled into a play list 108 and uploaded to the server 502 via link 526. At this point, system 500 transmits the play list to users 106 in the same manner as prior art system 100, via WINAMP® player 110 and SHOUTCAST® streaming broadcaster 114, over Internet 104 over link 528. Once a play list 108 is transmitted, accounting module 510 can then authorize payment to disc jockey 504.

Once a play list 108 or a series of play lists 108 have been transmitted to the Internet, the log file 116 will contain data regarding what was played. The data contained in log file 116 can then be utilized by dynamic show creation module 512. The dynamic show creation module 512 is used for creating a play list 108 based on previously played play lists.

This is accomplished by first generating a performing arts report at module 514. The performing arts report extracts data from the log file regarding artists played, song type and other parameters. Analyzer 516 then methodically examines the performing arts report 514. Finally, the dynamic show creator designs a show based on the results upon selections for a desired type of play list and the results of analyzer 516. For example, a desired play list may be defined as songs of a certain genre/tempo in the first half of a show, followed by a different genre/tempo.

Figure 6:
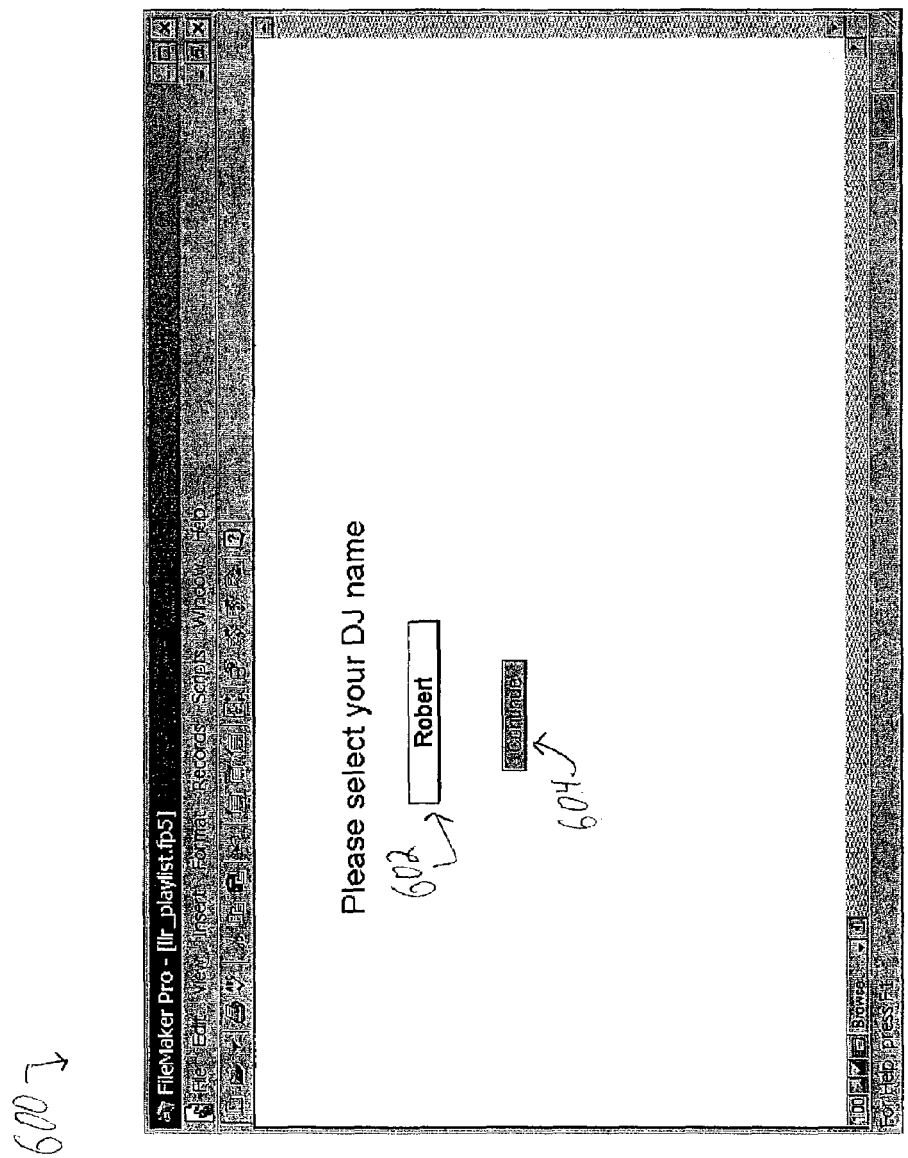
FIG. 6 illustrates a disc jockey sign on screen in accordance with the present invention.

FIG. 6 illustrates a disc jockey sign on screen 600 in accordance with the present invention. Sign on screen 600 is the first screen that a disc jockey 504 sees in the process of creating a show segment. A disc jockey selects his name via box 602 and clicks on CONTINUE 604.

Figure 7:
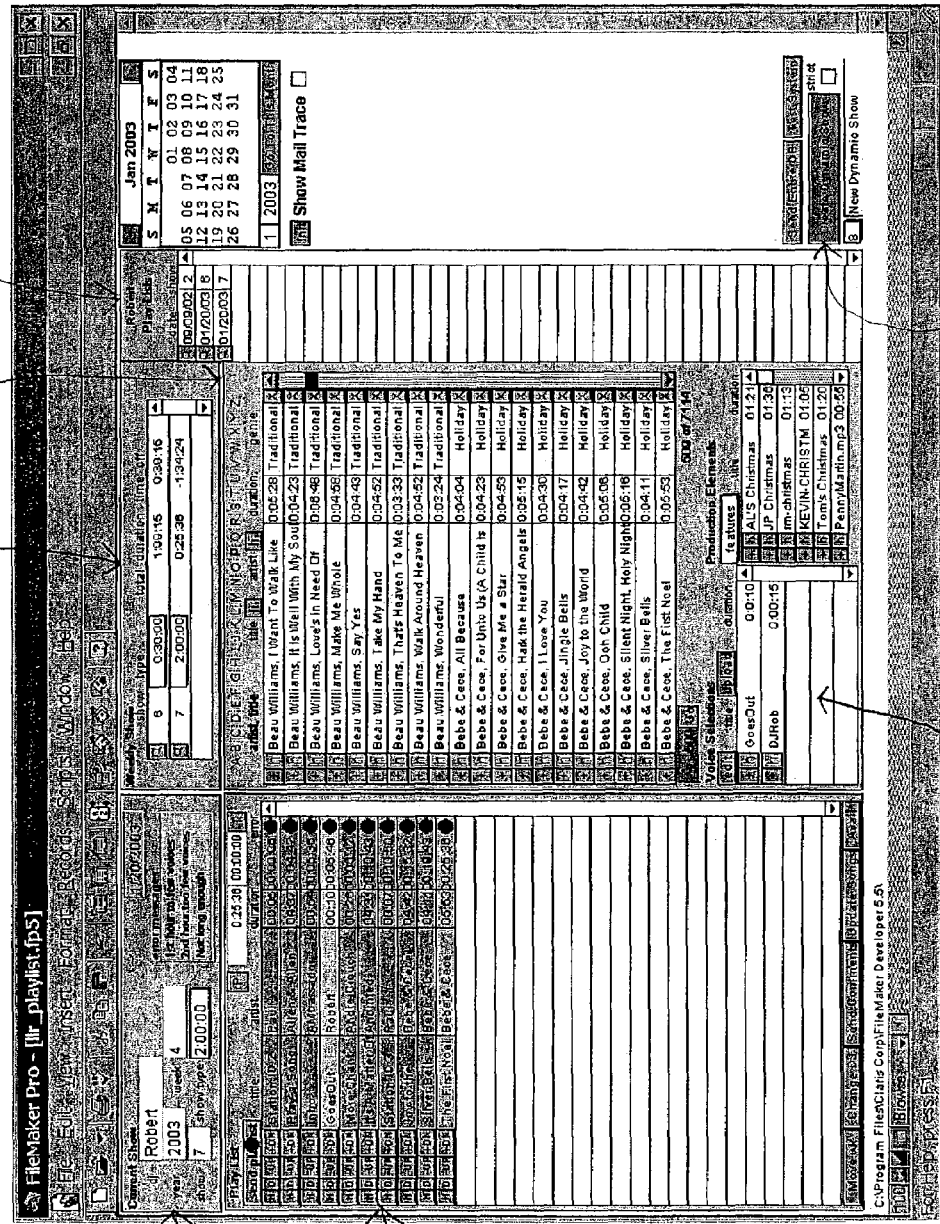
FIG. 7 illustrates a main screen in accordance with the present invention.

FIG. 7 illustrates a main screen 700 in accordance with the present invention. After a disc jockey signs in, screen 700 is displayed. Included on screen 700 is a play list segment 702, a list of available song tracks/voice tracks/production elements 704 that can be included in building a play list segment 702 and a current show summary segment 706. Also included is a: weekly show segment 708 for accessing other show segments not currently being worked on and a previously created play list segment 710 that can access older play lists. By accessing the various parts of main screen 700, a play segment 702 can be created. For example, song tracks, voice tracks and production elements from list 704 can be dragged and dropped to play list segment 704. Conversely, song tracks, voice tracks and production elements can also be removed from or moved around in list 704.

As previously mentioned, once a play list segment is created, only information regarding identification of song tracks and production elements are sent to the server 502, along with voice tracks. Thus voice tracks are created locally in relation to a disc jockey. To create voice tracks, voice track selection submodule 712 can be accessed to edit and upload voice tracks. Also previously mentioned was the dynamic show creation module 512 on server 502. To initiate this process, the create a dynamic show button 714 can be clicked.

Figure 8:
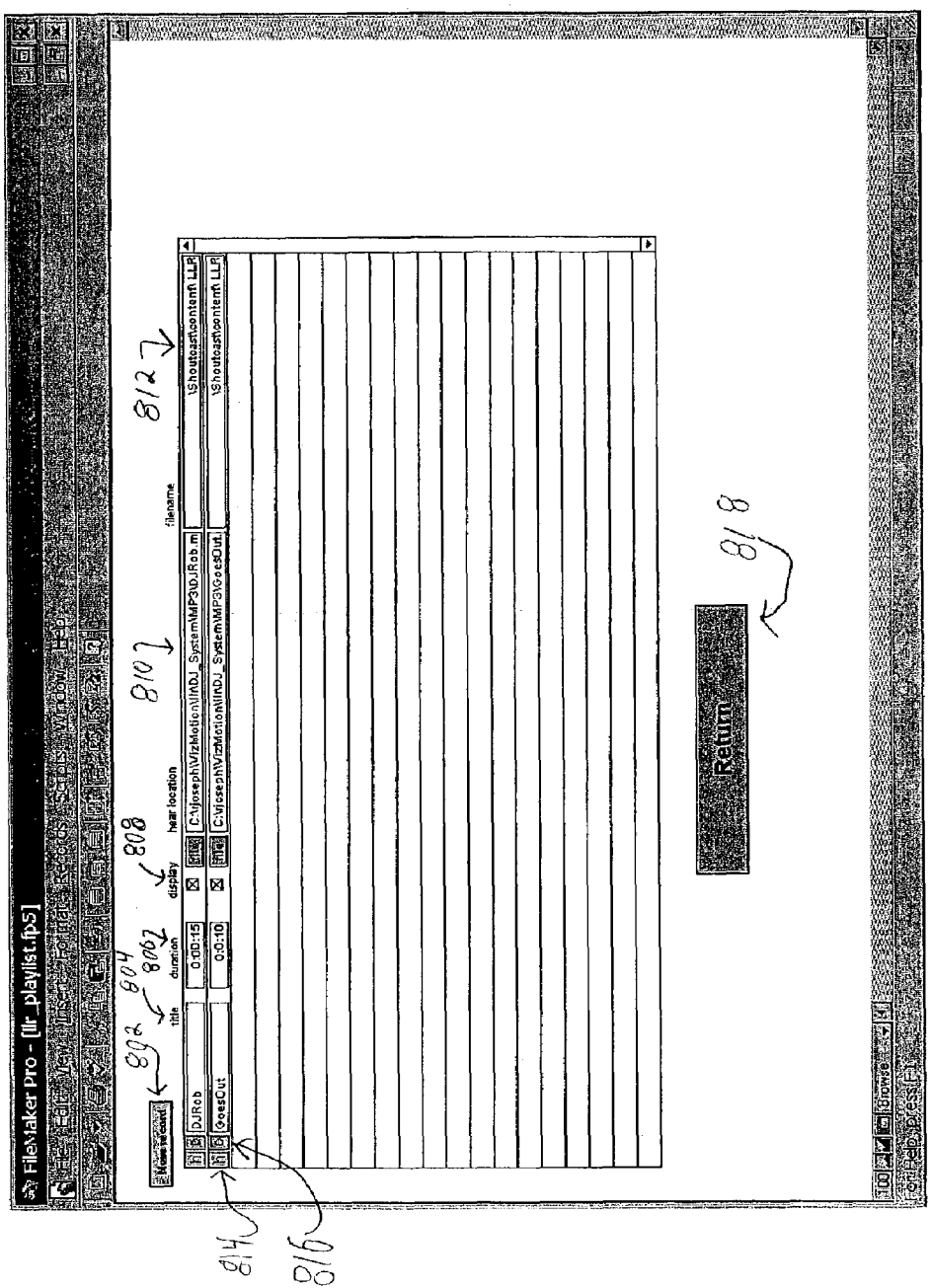
FIG. 8 illustrates a voice track selection screen in accordance with the present invention.

FIG. 8 illustrates a voice track screen 800 in accordance with the present invention. Voice track screen 800 can be accessed via "edit" the voice track selection module 712. Utilizing voice track screen 800, a new voice track can be created by accessing the new record button 802. Included in screen 800 is title info 804, track duration 806, a display option 808, a file location 810 and a filename 812. Additionally, an individual voice track can be listened to by clicking the "h" 814. Also, an individual voice track can be deleted via the "D" button 816. Voice track screen 800 can be exited via Return 818.

Figure 9:
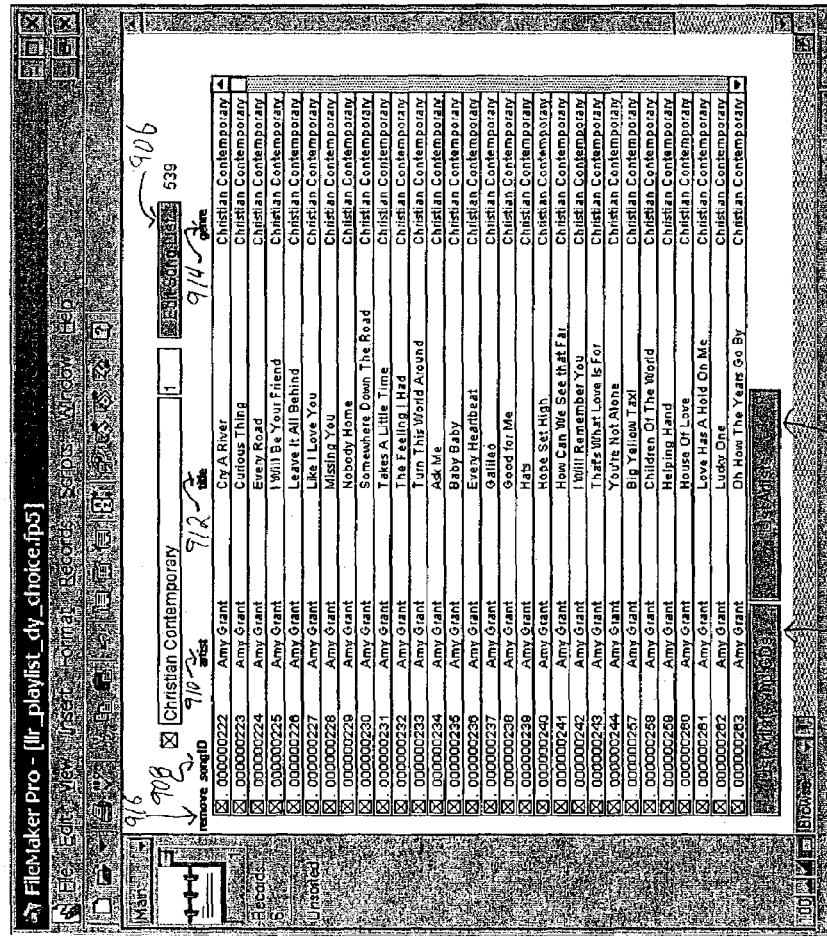
FIG. 9 illustrates a dynamic show song selection screen in accordance with the present invention.

FIG. 9 illustrates a dynamic show song selection screen 900 in accordance with the present invention. Dynamic show song selection screen 900 can be accessed by clicking on the "Go" button of screen 700. Included in the dynamic show song selection screen 900 is a list artists and cd's button 902, a list artists (only) button 904 and an edit song list button 906. Also included is information regarding a songID 908, an artist name 910, a song title 912 and genre 914. Additionally, a song can be removed by clicking the appropriate box under remove 916.

Figure 10:
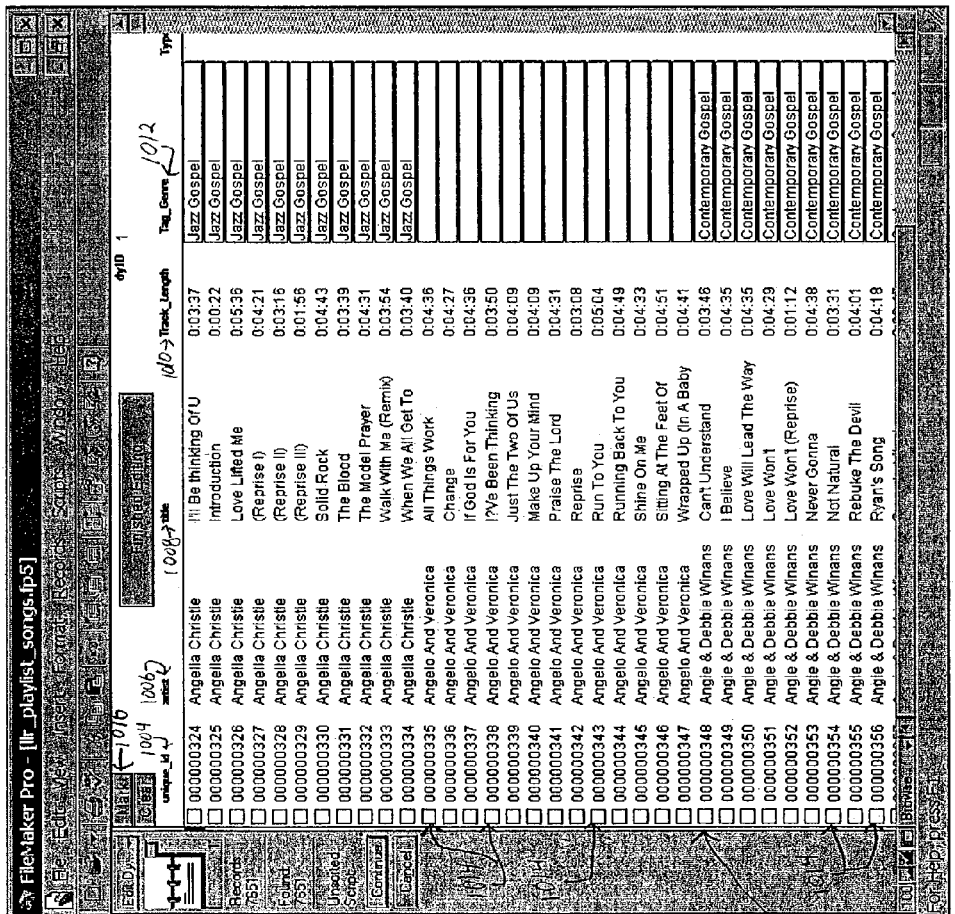
FIG. 10 illustrates an edit dynamic show song selection screen in accordance with the present invention.

FIG. 10 illustrates an edit dynamic show song selection screen 1000 in accordance with the present invention. Edit dynamic show song selection screen 1000 can be reached by accessing the edit song list button 906 of screen 900.

Included is a list of available songs that include a unique ID 1004, an artist descriptor 1006, a title 1008, a track length 1010, and a genre tag 1012. Individual tracks can be marked by checking a box 1014. Alternatively, the mark button 1016 can be clicked to check all of the boxes 1014.

Figure 11:
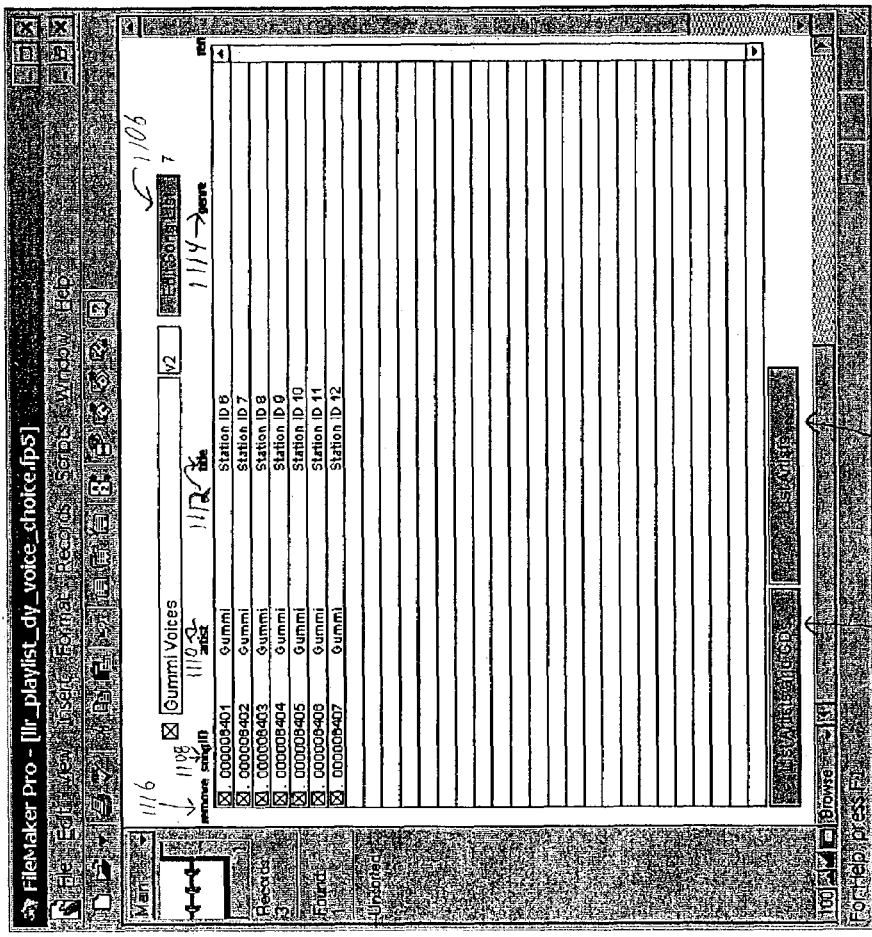
FIG. 11 illustrates a dynamic show voice track selection screen in accordance with the present invention.

FIG. 11 illustrates a dynamic show voice track selection screen 1100 in accordance with the present invention. Screen 1100 includes a list artists and cd's button 1102, a list artists (only) button 1104 and an edit song list button 1106. Also included is information regarding a songID 1108, an artist name 1110, a song title 1112 and genre 1114. Additionally, a song can be removed by clicking the appropriate box under remove 1116.

Figure 12:
FIG. 12 illustrates an edit dynamic show voice selection screen in accordance with the present invention.

FIG. 12 illustrates an edit dynamic show voice selection screen 1200 in accordance with the present invention. Included is a list of available voice tracks 1202 that include a unique ID 1004, an artist descriptor 1206, a title 1208, a track length 1210, and a genre tag 1212. Individual tracks can be marked by checking a box 1214. Alternatively, the mark button 1216 can be clicked to check all of the boxes 1214.

Referring back to FIG. 5, in a preferred embodiment of the present invention, the dynamic show creation module 512 creates shows based on the contents log file 116. As previously stated, log file 116 is generated by SHOUT-CAST® streaming broadcaster 114 and is influenced by responses of listeners. For example, log file 116 tracks listeners habits such as how long they listen and other parameters. By utilizing rules set up by an individual, inputted into analyzer 516, and log file 116, the dynamic show creation module 512 creates the show. Advantageously, this allows for a "virtual" D.J. to be created.

In another embodiment of the present invention, individual D.J.'s 504 can automatically create a segment based upon rules at their individual workstation. Then, if desired, manual changes can be made to the segment before it is uploaded to server 502.

Figure 13:
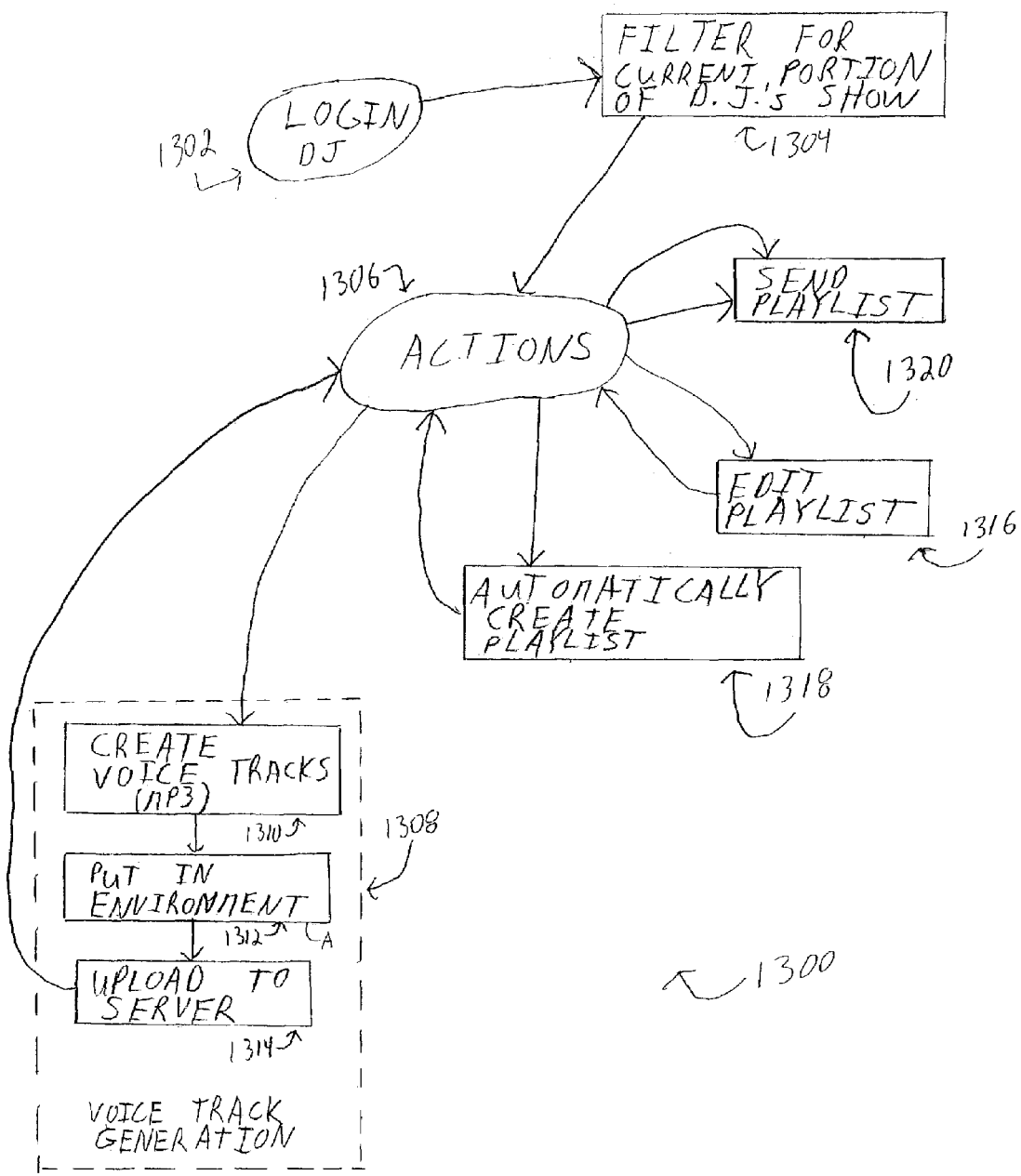
FIG. 13 illustrates the actions available to a disc jockey for creating a program in accordance with the present invention.

FIG. 13 illustrates the actions 1300 available to a disc jockey for creating a program in accordance with the present invention. After an initial login 1302, the current portion of the disc jockey's show is filtered for at an operation 1304. After operation 1306, the disc jockey has a number of action options available via operation 1306. One option is to generate voice tracks at operation 1308. The first step of operation 1310 is to create .mp3 voice track files at sub-operation 1310. The next step is to put them into the Internet radio station/disc jockey system environment at sub-operation 1312. After sub-operation 1312, the voice tracks are uploaded to server 502 (not shown) via sub-operation 1314. Other actions include edit playlist 1316, automatically create play list 1318 and send play list to server 502 (not shown) via operation 1320. It will be appreciated by one skilled in the art that the various operations 1308, 1316, 1318, and 1320 can be performed in any order as deemed necessary by a disc jockey creating a show segment and is not limited to the order specified here.

Figure 14:
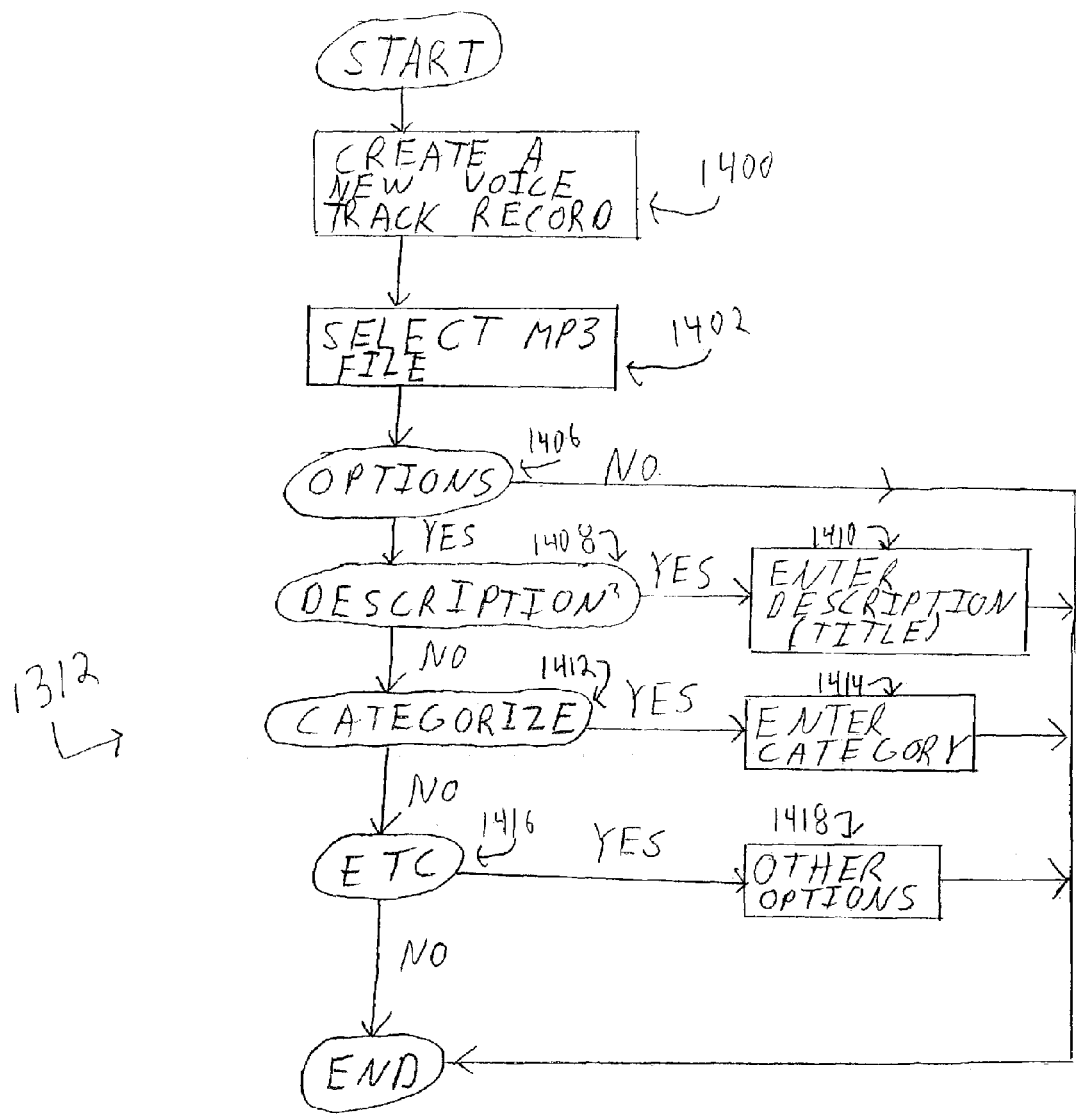
FIG. 14 further illustrates the put in environment operation in accordance with the present invention.

FIG. 14 further illustrates the put in environment operation 1312 in accordance with the present invention. Beginning at START, a new voice track record is created via operation 1400. A .mp3 file is selected at operation 1402 and then a disc jockey can determine what options to do (if any) via decision point 1406. If yes, a description can be selected via operation 1408 and a description can be entered via operation 1410. At option 1412, the voice track can be categorized and the category can be entered at operation 1414. In a similar fashion, other fields relating to the voice track can be selected and specified at generic operations 1416 and 1418. The put in environment operation 1312 is then completed at END.

Figure 15:
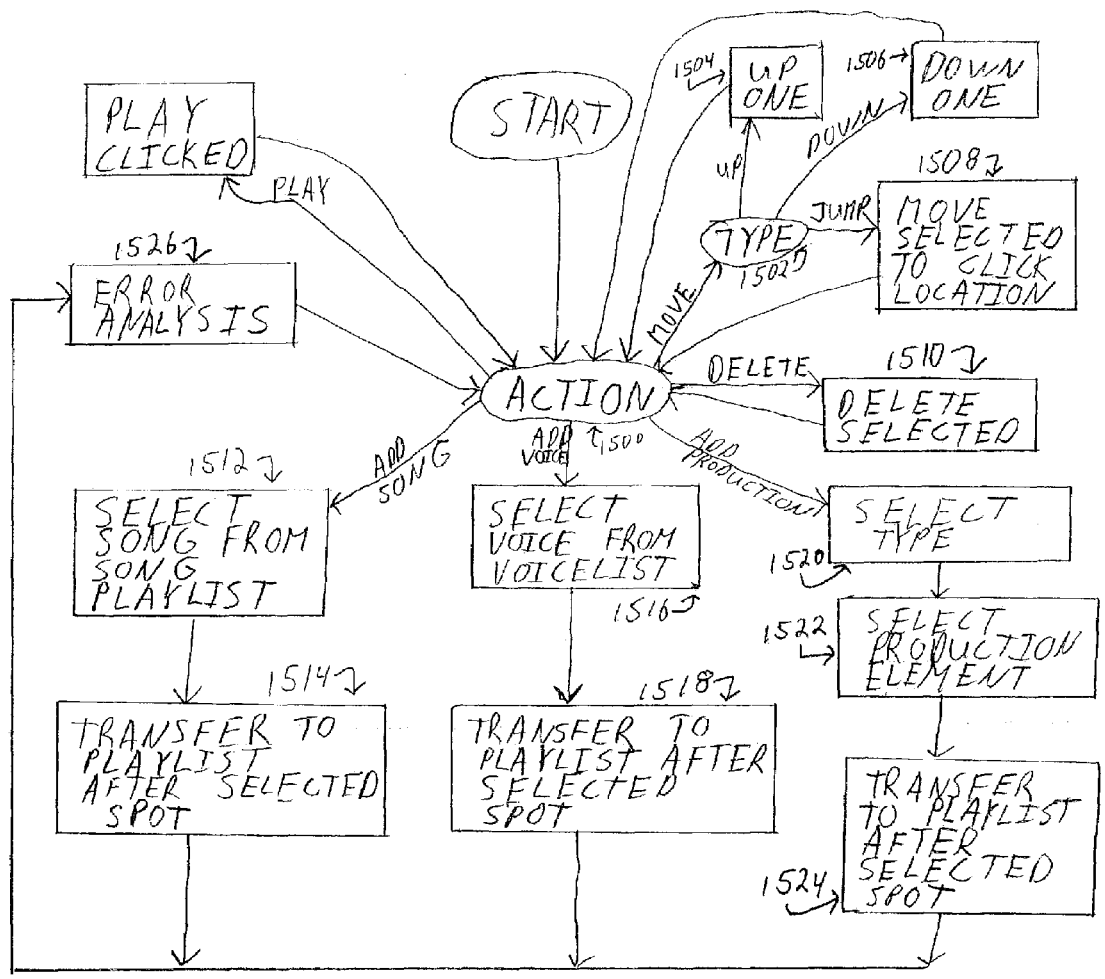
FIG. 15 further illustrates the edit play list operation in accordance with the present invention.

FIG. 15 further illustrates the edit play list operation 1316 in accordance with the present invention. Beginning at START, control is passed to Action selection point 1500. One type of action available is to move a track in the play list (not shown) by selecting the type of move, via operation 1502. For example, a track could be moved up one via operation 1504 or moved down one via operation 1506. Alternatively, a track can be moved to specific location other than directly above or below its current location, via operation 1508. The selected track can also be deleted via operation 1510.

A song can be added to a play list by selecting a song at operation 1512 and then transferring the song to the play list after the selected spot, via operation 1514. In a similar fashion, a voice track can be added by selecting the voice track via operation 1516 and transferring the song to the play list after the selected spot, via operation 1518. Also, a production element can be added to the play list by first selecting the type at an operation 1520, selecting the production element 1522 and then transferring the production element to the play list after the selected spot, via operation 1524. Finally, after operations 1514, 1518 and 1524 are completed, an error analysis is performed to ensure that the play list meets any pre-requisites. Some of those pre-requisites could include a minimum number of voice tracks and songs per hour, a certain ordering of play list elements, etc.

Figure 16:
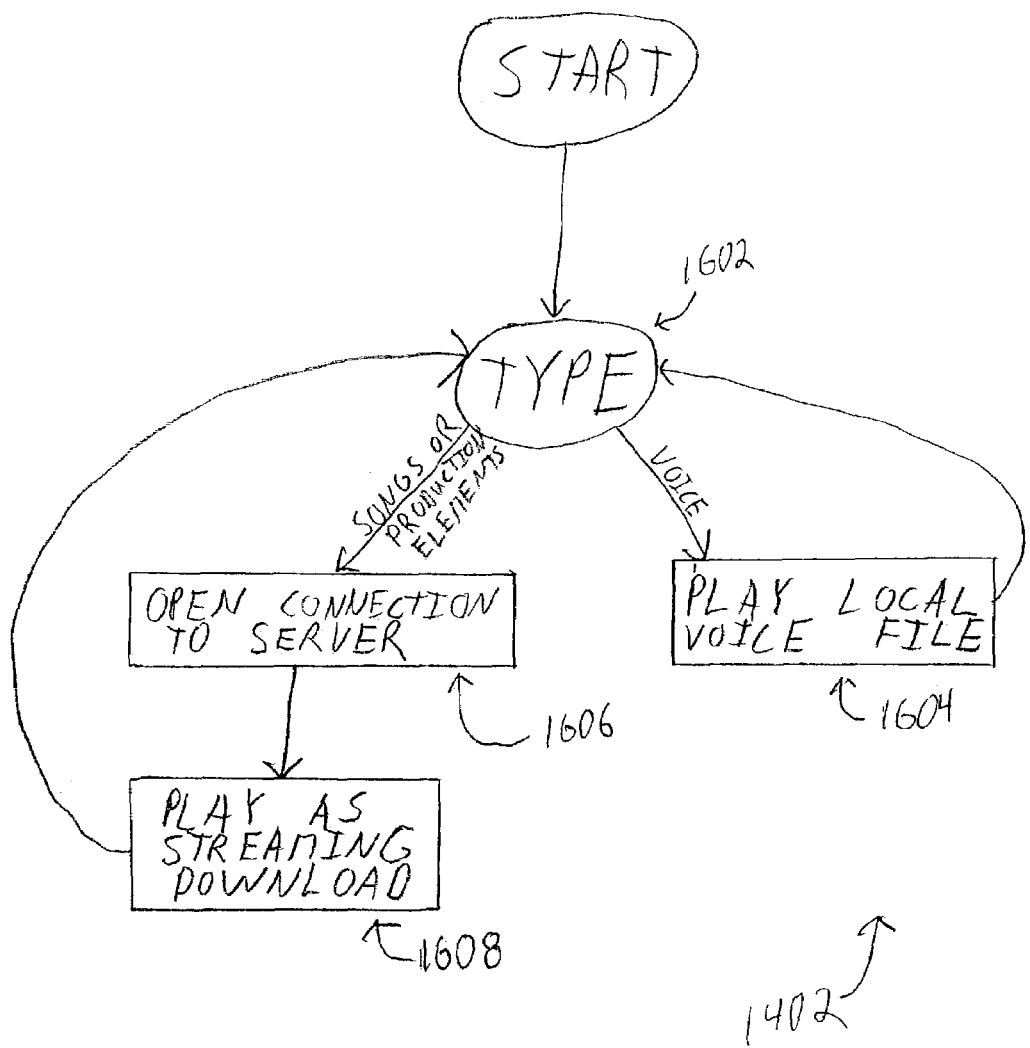
FIG. 16 further illustrates the select .mp3 file operation in accordance with the present invention.

FIG. 16 further illustrates the select .mp3 file operation 1402 in accordance with the present invention. Beginning at START, the type of voice track record can be selected via decision point 1602. If a regular type voice track is requested, it is played via operation 1604. Alternatively, if a production element is selected, a connection is opened to server 502, via operation 1606. The production element is then played as a streaming download, via operation 1608.

FIG. 17 illustrates the errors analysis screen 1700 in accordance with the present invention. Darkened circles 1702 indicate errors, on a play list segment 1704. Information relating to the errors is shown in error box 1708. For example, there are duplicate songs, the first hour does not have enough voice tracks and there is not enough material to fill up the entire play list segment. It will be appreciated by one skilled in the art that these are merely example errors and as such does not limit the present invention. It is preferable for a disc jockey to address the errors before sending a completed play list segment to server 502 (not shown).

FIG. 18 illustrates the producer sign on screen 1800 in accordance with the present invention. A producer first enters their user identification in box 1802, their password in box 1804 and then clicks on Logon 1806 to initiate the logon process.

FIG. 19 illustrates the main screen of the producer section 1900 of the present invention. Producer main screen 1900 differs from disc jockey main screen 700 (not shown) in that there is a play list manipulation segment 1902. Segment 1902 is used for creating a dynamic show, reading a new play list, delete a play list, send a play list to server 502 (not shown), edit a play list and various other related functions. Additionally, a disc jockey selection segment 1904 is available wherein a play list segment sent in by a disc jockey can be viewed when the box adjacent to their name is checked.

FIG. 20A illustrates the selection of one disc jockey 2000 in accordance with the present invention. In this particular example, disc jockey Paul 2006 is selected. As a result of the selection 2002, all of the play list segments sent in by Paul, to the server 502 (not shown), are shown at 2004. FIG. 20B illustrates the selection of four disc jockeys 2006 in accordance with the present invention. This time, in addition to the selection of disc jockey Paul 2002, disc jockeys Alphonsa 2008, Kevin 2010 and Jodi 2012 are also selected. As a result, all of the play list segments of the selected disc jockeys are displayed at 2004.

Figure 21:
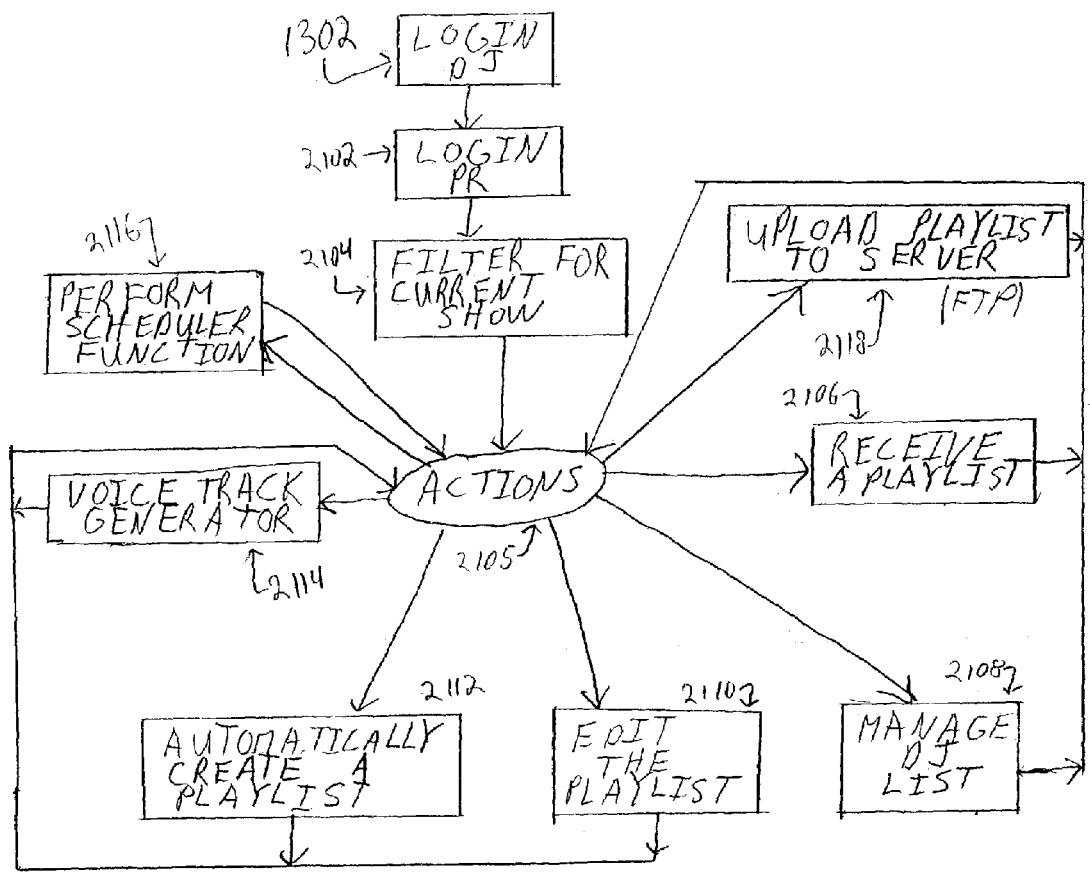
FIG. 21 illustrates the actions available to a producer in accordance with the present invention.

FIG. 21 illustrates the actions 2100 available to a producer in accordance with the present invention. A producer first accesses the system through the disc jockey login operation 1302 and can then access the producer section via producer login operation 2102. After operation 2102, a current show is filtered for via operation 2104. Next, several actions are available via operation 2105. For example, a play list can be received via operation 2106, the disc jockey list can be managed at operation 2108 and the play list can be edited at operation 2110. Alternatively, a play list can also automatically be created at operation 2112. Similarly, voice tracks can be generated at operation 2114. After a play list is verified as fit for play, it can be scheduled for a time slot at operation 2116 and then uploaded to server 502 (not shown) via operation 2118. One example of how the play list is sent is file transfer protocol (ftp).

Figure 22:
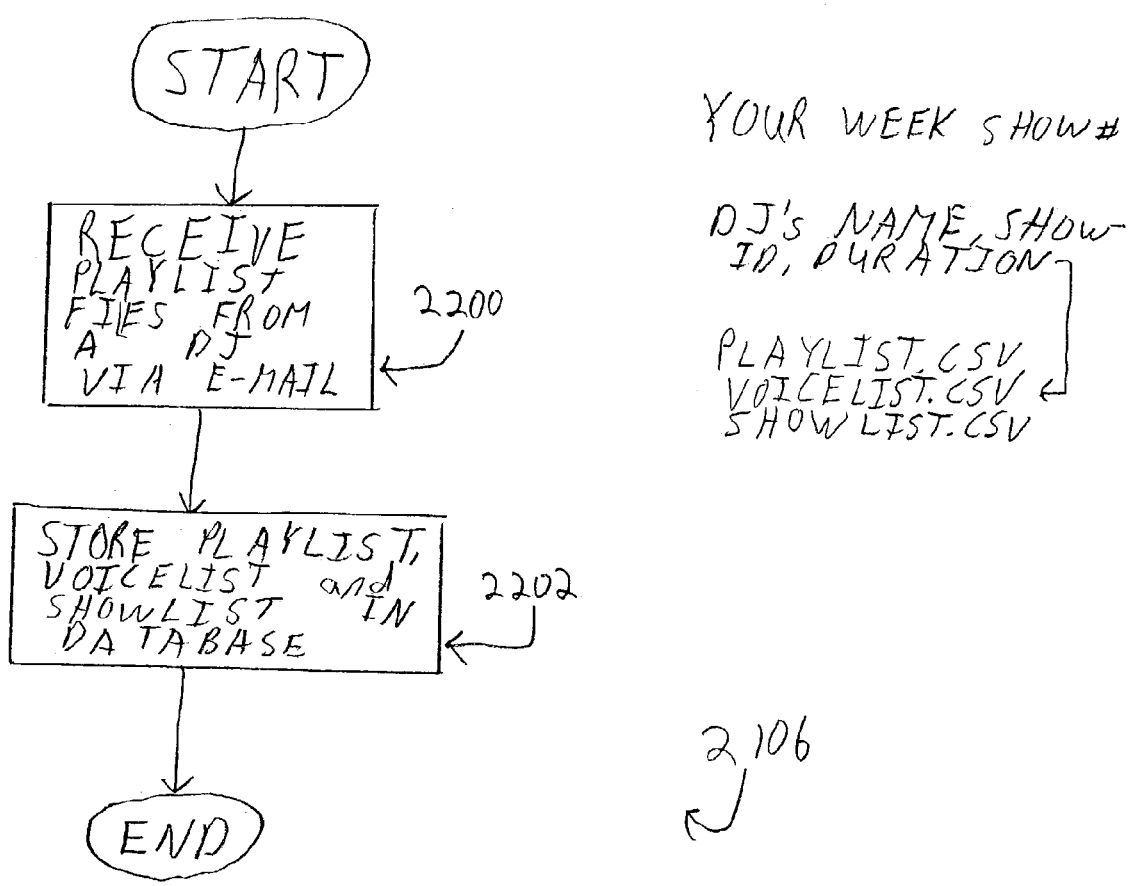
FIG. 22 further illustrates the receive play list function in accordance with the present invention.

FIG. 22 further illustrates the receive play list function 2106 in accordance with the present invention. After START, play list files are received from a disc jockey in an e-mail message at operation 2200. The play list voice list and show list are then stored in the database at operation 2202. Process 2106 then finishes at END. In a preferred embodiment, a week's worth of shows are retrieved at once for a particular disc jockey. Information regarding the name of the disc jockey, show identification information and duration. Also, the play list, voice list and show list are received in a ".csv" type file format (comma-separated or comma delimited).

Figure 23:
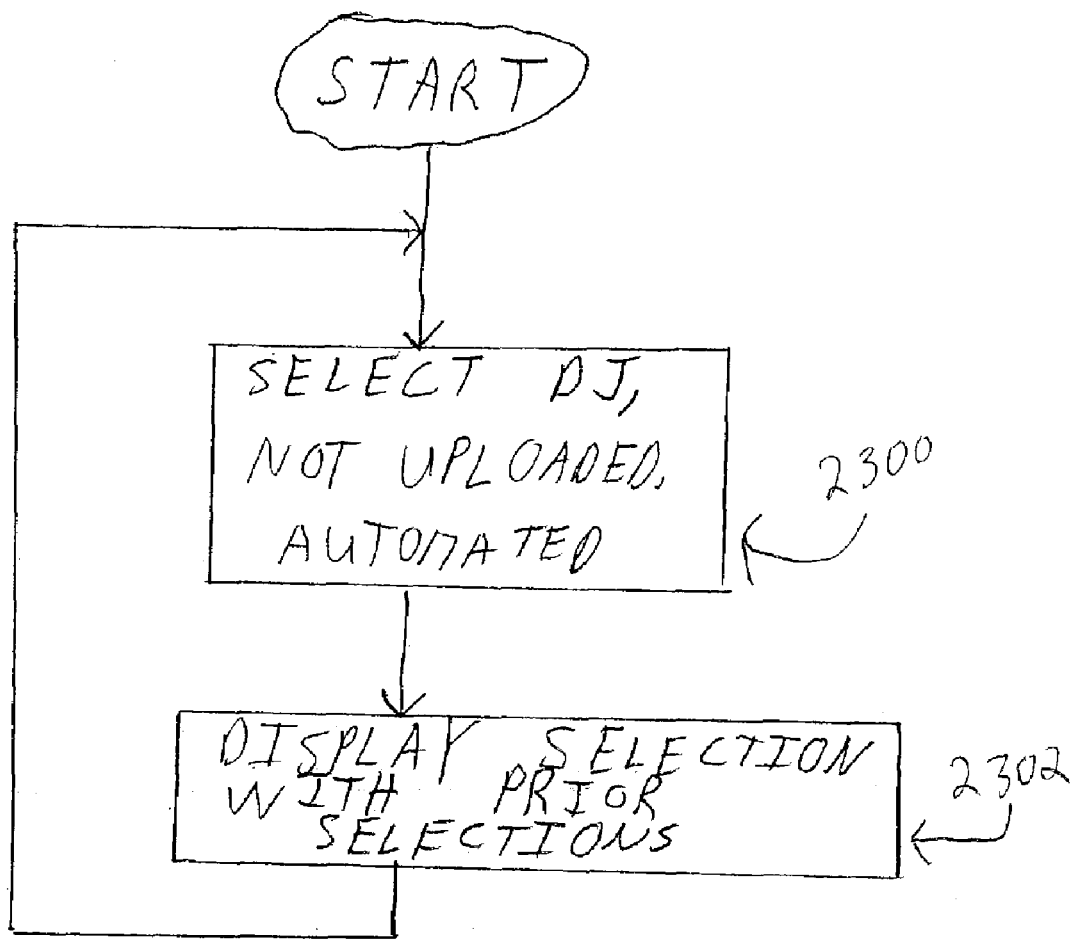
FIG. 23 further illustrates the manage DJ list function in accordance with the present invention.

FIG. 23 further illustrates the manage DJ list function 2108 in accordance with the present invention. After START, operation 2300 is used to select a disc jockey's name, ascertaining if the selected disc jockey has uploaded any play lists and if the play list sent in was automated—that is if it was automatically generated. At operation 2304, the selection is displayed with the prior selections.

Figure 24:
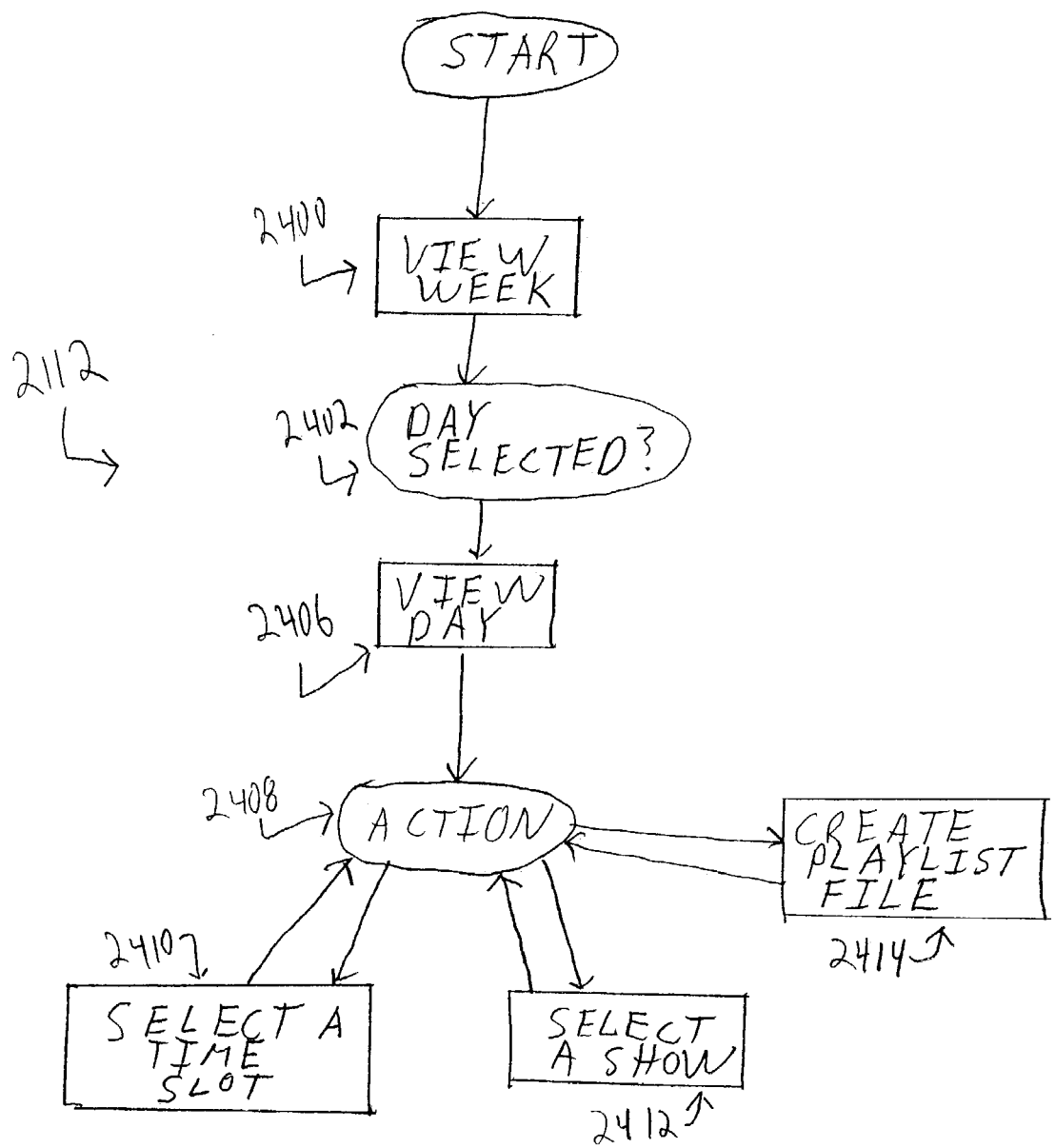
FIG. 24 further illustrates the perform scheduler function in accordance with the present invention.

FIG. 24 further illustrates the perform scheduler function 2112 in accordance with the present invention. After START, a week can be viewed by operation 2400 and an individual day can be selected at decision point 2402. The selected day is then viewed at operation 2406 and various actions then become available at operation 2408. Logically, a time slot is first selected, at operation 2410, and then a show is selected at operation 2412. Finally a play list file is created from the selected show/time slot at operation 2412.

FIG. 25 illustrates the scheduler system for a week view 2500 in accordance with the present invention. Included is information 2502 regarding what week is on the screen and a table 2504 that shows individual time slots by each day and time of day. Additionally, a week can be scrolled to either backward 2506 or forward 2508. Similarly, the next day (forward) 2510 can be accessed or the previous day (backward) 2512. Finally, an individual day can be edited by accessing button 2512 and the next day's schedule can be accessed by button 2514.

FIG. 26 illustrates the scheduler system for a single day view 2600 in accordance with the present invention. Included is table 2602 that shows where each disc jockey's shows have been scheduled along with information on the scheduled duration of the show and how long the actual show is. Additionally, the details of an individual time slot are shown in table 2604. In this example, disc jockey Tori was selected. The individual day view 2600 can be scrolled to a previous week 2606, a previous day 2608, the next day 2610 or the next week 2612. The play list schedule can be reset by button 2614, the play list files can be created by accessing button 2616 and finally, the week view can be accessed by button 2618.

In a preferred embodiment of the present invention, a method for creating a packet-based network program includes providing a network radio server having a music library and a list of songs in the music library, the network radio server being coupled to a packet-based network. Also, included in the method is communicating with a remote server connected to the packet-based network such that the remote server can download a list of songs and such that the remote server can upload a program segment to the network radio server, including at least one song title from the song list. Additionally, multiple segments can be arranged into a play list, the remote server can download at least a portion of a song in the music library and the network radio server can broadcast songs from the music library.

While this invention has been described in terms of certain preferred embodiments, it will be appreciated by those skilled in the art that certain modifications, permutations and equivalents thereof are within the inventive scope of the present invention. It is therefore intended that the following appended claims include all such modifications, permutations and equivalents as fall within the true spirit and scope of the present invention.

What is claimed is:

1. A method for producing a network-based radio show comprising:
    transmitting a plurality of segments over a network to a radio station server wherein the plurality of segments contain a plurality of voice tracks and an identification of song tracks located on the radio station server;
    verifying and arranging the plurality of segments into a play list on the radio station server; and
    broadcasting the play list from the radio station server onto the network to create a network-based radio show, via the network;
    wherein the play list is generated by a dynamic show creation module comprising
        a performing arts report based upon a log file wherein the log file is generated by a SHOUTCAST module;
        an analyzer, coupled to the performing arts report, for extracting a plurality of statistics; and
        a dynamic show creator, coupled to the analyzer, that develops a playlist based on the plurality of statistics.

2. The method as recited in claim 1 wherein the network is an Internet.

3. The method as recited in claim 1 wherein a producer verifies the plurality of segments for a set of criteria.

4. The method as recited in claim 3 wherein the set of criteria comprises a number of voice tracks, a number of songs and a number of commercials.

5. The method as recited in claim 3 wherein the set of criteria comprises a minimum number of voice tracks, a minimum number of songs and a minimum number of commercials.

6. The method as recited in claim 3 wherein the set of criteria comprises a maximum number of voice tracks, a maximum number of songs and a maximum number of commercials.

7. The method as recited in claim 1 wherein a plurality of disc jockeys can listen to the plurality of song tracks, located on the radio station server, before sending the plurality of segments over the network to the radio station server.

8. The method as recited in claim 1 wherein the radio station server further comprises:
   a player module for playing the plurality of segments;
   a broadcasting module, coupled to the player module for broadcasting the play list.

9. The method as recited in claim 8 further comprising an accounting module for paying the plurality of disc jockeys upon sending a completed play list.

10. A system for a network-based radio show comprising:
    a network radio station server, coupled to a network, for hosting a plurality of segments arranged by a producer into a play list wherein the play list is available to a plurality of users via the network; and
    a plurality of disc jockey stations that create and upload the plurality of segments over the network to the radio station server;
    wherein the play list is generated by a dynamic show creation module comprising
    a performing arts report based upon a log file wherein the log file is generated by a broadcasting module;
    an analyzer, coupled to the performing arts report, for extracting a plurality of statistics; and
    a dynamic show creator, coupled to the analyzer, that develops a playlist based on the plurality of statistics.

11. The system as recited in claim 10 wherein the network is an Internet.

12. The system as recited in claim 10 wherein the producer verifies the plurality of segments for a set of criteria, before the plurality of segments are arranged into a play list.

13. The system as recited in claim 10 wherein the radio station server further comprises:
    a player module for playing the plurality of segments;
    a broadcasting module, coupled to the player module for broadcasting the play list.

14. The system as recited in claim 13 further comprising an accounting module for paying the plurality of disc jockeys upon sending a completed play list.

* * * * *

UNITED STATES PATENT AND TRADEMARK OFFICE
CERTIFICATE OF CORRECTION

PATENT NO. : 7,349,663 B1  
APPLICATION NO. : 10/422691  
DATED : March 25, 2008  
INVENTOR(S) : Robert L. Joseph Page 1 of 1

It is certified that error appears in the above-identified patent and that said Letters Patent is hereby corrected as shown below:

Cover sheet / first page, at field (75), after "Inventor:" add --Donna M. Auguste, Denver, CO (US)--.

Signed and Sealed this

Nineteenth Day of August, 2008

JON W. DUDAS  
*Director of the United States Patent and Trademark Office*